(12) United States Patent
Ryu et al.

(10) Patent No.: US 10,718,674 B1
(45) Date of Patent: Jul. 21, 2020

(54) FRACTO-MECHANOLUMINESCENT (FML) CRYSTALS-ENHANCED OPTICAL FIBER-BASED IMPACT SENSOR MODULE

(71) Applicant: New Mexico Tech University Research Park Corporation, Socorro, NM (US)

(72) Inventors: Donghyeon Ryu, Socorro, NM (US); Quinlan James Towler, Belen, NM (US)

(73) Assignee: New Mexico Tech University Research Park Corporation, Socorro, NM (US)

( * ) Notice: Subject to any disclaimer, the term of this patent is extended or adjusted under 35 U.S.C. 154(b) by 0 days.

(21) Appl. No.: 16/222,810

(22) Filed: Dec. 17, 2018

Related U.S. Application Data

(60) Provisional application No. 62/599,629, filed on Dec. 15, 2017.

(51) Int. Cl.
*G01L 1/24* (2006.01)
*G01B 11/16* (2006.01)
*C09K 11/02* (2006.01)

(52) U.S. Cl.
CPC ............ *G01L 1/242* (2013.01); *C09K 11/025* (2013.01); *G01B 11/16* (2013.01)

(58) Field of Classification Search
CPC ........ G01L 1/242; C09K 11/025; G01B 11/16
(Continued)

(56) References Cited

U.S. PATENT DOCUMENTS 5,905,260 A * 5/1999 Sage .......................... G01L 1/24
  250/307
6,581,474 B2 * 6/2003 Goods .................... G01N 21/70
  73/800
(Continued)

FOREIGN PATENT DOCUMENTS

KR     10-1463215 B1    12/2014

OTHER PUBLICATIONS

Holguin, Brandon , et al., "Development of 3D Impact Self-Sensing Composites Using Fracto-mechanoluminescent EuD4TEA", SMASIS2017-3980 from Proceedings of the ASME 2017 Conference on Smart Materials, Adaptive Structures and Intelligent Systems, Snowbird, UT, Sep. 18, 2017 (Year: 2017).*
(Continued)

*Primary Examiner* — Roy M Punnoose
(74) *Attorney, Agent, or Firm* — Peacock Law P.C.; Philip D. Askenazy

(57) ABSTRACT

An Impact sensor for detecting strain or strain rate in a composite having one or more sensor nodes using a fracto-mechanoluminescent (FML) material, such as $EuD_4TEA$ crystals, encased in an optically transparent material such as PDMS. Optical fibers transmit light emitted by the FML material due to strain experienced by the composite. For honeycomb composites, the transparent material is disposed within cells of the honeycomb composite. A reflective material such as Mylar either surrounds the optically transparent material or lines the cell. The intensity of the light emitted by the FML material is related to the magnitude of strain or strain rate experienced by the composite as well as the distance of the FML material from the surface of the composite that receives the impact. Multiple sensor nodes disposed at different distances from the impact surface can
(Continued)

provide a three-dimensional map of damage experienced by the composite.

13 Claims, 18 Drawing Sheets

(58) Field of Classification Search
USPC .......................................................... 356/320
See application file for complete search history.

(56) References Cited

U.S. PATENT DOCUMENTS

| | | | | |
|---|---|---|---|---|
| 6,710,328 | B1* | 3/2004 | Mastro | G01L 1/24 250/227.11 |
| 7,270,770 | B2* | 9/2007 | Sage | C09K 11/06 156/67 |
| 7,307,702 | B1* | 12/2007 | Mathur | G01L 1/24 356/32 |
| 8,404,162 | B2* | 3/2013 | Okoli | C08J 9/0066 264/112 |
| 9,274,025 | B2* | 3/2016 | Okoli | G02B 6/02033 |
| 9,983,072 | B2 | 5/2018 | Kim et al. | |
| 10,386,305 | B2* | 8/2019 | Okoli | G01N 21/70 |
| 2002/0148300 | A1* | 10/2002 | Goods | G01N 21/70 73/800 |
| 2010/0227153 | A1* | 9/2010 | Okoli | C08J 9/0066 428/317.9 |
| 2013/0164523 | A1* | 6/2013 | Okoli | C08J 9/0066 428/319.1 |

OTHER PUBLICATIONS

Belk, Cynthia A, et al., "Meteoroids and Orbital Debris: Effects on Spacecraft", NASA Technical Report RP-1408, Aug. 1997.
Chandra, B P, et al., "Modelling of fracto-mechanolumiscent damage sensor for structures", Sensors and Actuators A 230 (2015), Apr. 21, 2015, 83-93.
Chandra, B P, et al., "Models for intrinsic and extrinsic fracto-mechanoluminiscence of solids", J. Lumin. 135 (2013), Nov. 2, 2012, 139-153.
Chang, Chia-Chen , et al., "Design of fiber optic sensor systems for low velocity impact detection", Smart Mater. Stuct. 7, 1998, 166-177.
Chen, W , et al., "A split Hopkinson bar technique for low-impedance materials", Experimental Mechanics 39, 1999, 81-85.
Delebarre, Christophe , et al., "Autonomous Piezoelectric Structural Health Monitoring System for on-Production Line Use", Adv. Appl. Ceram. 114(4), 2015, 205-210.
Fontenot, Ross S, et al., "Effects of crystalline grain size on the tribolumiscent emmission for EuD4TEA", Adv. Mat. Lett. 2013, 4(8), 2013, 605-609.
Fontenot, Ross S, et al., "Triboluminscent materials for smart sensors", Materials Today, Jun. 2011, vol. 14, No. 6, Jun. 2011, 292-293.
Gomez, Javier , et al., "Proof of concept of Impact Detection in Composites using fiber bragg grating arrays", Sensors 2013, 13, Sep. 9, 2013, 11998-12011.
Hackney, D , et al., "Damage identification after impact in sandwich composites through embedded fiber bragg sensors", Journal of Intelligent Material Systems and Structures, vol. 22, Aug. 2011, 1305-1316.
Haywood, J , et al., "An automatic impact monitor for a composite panel employing smart sensor technology", Smart Mater. Struct. 14 (2005), Dec. 23, 2004, 265-271.
Holguin, Brandon , et al., "Development of 3D Impact Self-Sensing Composites Using Fracto-mechanoluminescent EuD4TEA", SMASIS2017—3980 from Proceedings of the ASME 2017 Conference on Smart Materials, Adaptive Structures and Intelligent Systems, Snowbird, UT, Sep. 18, 2017.
Hurt, C R, et al., "High Intensity Triboluminescence in Europium Tetrakis", Nature 212, 1966, 179-180.
Kang, Lae-Hyong , "Vibration and impact monitoring of a composite-wing model using piezoelectric paint", Advanced Composite Materials vol. 23, 2014—Issue 1, Nov. 25, 2013, 73-84 (Abstract only).
Kim, Ji Sik, et al., "Mechanoluminiscent SrAl2O4Eu,Dy phosphor for use in visualization of quasidynamic crack propagation", Appl. Phys. Lett. 90, 241916 (2007), Jul. 14, 2007.
Kolsky, H , "An Investigation of the Mechanical Properties of Materials at very high rates of loading", Proc. Phys. Soc. B 62, Oct. 7, 1949, 676-700.
Kuang, K S C, et al., "Residual strain measurement and impact response of optical fibre bragg grating sensors in fibre metal laminates", Smart Mater. Struct. 10, 2001, 338-346.
Loh, Kenneth J, et al., "Carbon Nanotube Sensing Skins for Spatial Strain and Impact Damage Identification", J. Nondestruct Eval (2009) 28:9, Mar. 19, 2009, 1-25.
Olawale, David O, et al., "Getting light through cementitious composites with in situ triboluminescent damage sensor", Structural Health Monitoring 2014 vol. 13(2), 2013, 177-189.
Pawar, Sachin S, et al., "Through-thethickness identification of impact damage in composite laminates through pulsed phase thermography", Meas. Sci. Technol. 24 (2013), Oct. 9, 2013, 115601-115617.
Prosser, William H, et al., "Acoustic Emission Signals in Thin Plates Produced by Impact Damage", Journal of Acoustic Emission, vol. 17(1-2), Jun. 1999, Jun. 1999, 29-36.
Ramesh, K T, "High Strain Rate and Impact Experiments", Springer Handbook of Experimental Solid Mechanics ed W Sharpe Jr. (Berlin: Springer) 33 929-60, 2008.
Rodriguez , "Micrometeroids and Orbital Debris (MMOD)", https://www.nasa.gov/centers/wstf/site_tour/remote_hypervelocity_test_laboratory/micrometeoroid_and_orbital_debris.html, Jun. 14, 2016.
Ryu, Donghyeon , et al., "Analyzing Strain Sensing Response of Photoactive Thin Films Using Absorption Spectroscopy", Key Engineering Materials vols. 569-570 (2013), Jul. 2013, 695-701.
Ryu, Donghyeon , et al., "Fracto-mechanoluminescent light emission of EuD4TEA-PDMS composites subject to high strain-rate compressive loading", Smart Mater. Struct. 26 (2017), Jul. 6, 2017, 085006-085014.
Ryu, Donghyeon , et al., "Mechanoluminscent Composites Towards Autonomous Impact Damage Detection of Aerospace Structures", Conference Paper, 10th International Workshop on Structural Health Monitoring (IWSHM), Stanford, CA, Jan. 2015.
Ryu, Donghyeon , et al., "Multi-modal sensing using photoactive thin films", Smart Mater. Struct. 23, Jul. 2, 2014, 085011-085026.
Ryu, Donghyeon , et al., "Strain sensing using photocurrent generated by photoactive P3HT-based nanocomposites", Smart Mater. Struct. 21 (2012), May 22, 2012, 06516-065024.
Sage, I , et al., "Getting light through black composites: embedded triboluminescent structural damage sensors", Smart Mater. Struct. 10 (2001), 2001, 332-337.
Sage, I , et al., "Triboluminscent damage sensors", Smart Mater. Struct. 8 (1999), Jul. 14, 1999, 504-510.
Sage, Ian , et al., "Triboluminescent materials for structural damage monitoring", J. Mater. Chem., 2001, 11, Jan. 8, 2001, 231-245.
Terasaki, Nao , et al., "Active Crack Indicator with Mechanoluminscent sensing technique", IEEE Sensors Applications Symp. Proc. (Brescia, Italy), 2012.
Towler, Quinlan , et al., "Multifunctional Mechanoluminscent Composites for Autonomous Impact Detection of Aerospace Structures", Proceedings of the 11th International Workshop on Structural Health Monitoring, Stanford, CA, Sep. 12, 2017.
Yang, Y C, et al., "Damage monitoring and impact detection using optical fiber vib. sensors", Smart Mater. Struct. 11 (2002), May 16, 2002, 337-345.
Yun, Gun Jin, et al., "Stress sensing performance using mechanoluminscence of SAOE and SAOED under mechanical loadings", Smart Mater. Struct. 22 (2013), Mar. 25, 2013, 055006-055017.
Zhan, T Z, et al., "Enhancement of impact-induced mechanoluminescence for structure health monitoring using swift

(56) References Cited

OTHER PUBLICATIONS heavy ion irradiation", SPIE Proceedings vol. 8342: Behavior and Mechanics of Multifunctional Materials and Composites 2012, Mar. 28, 2012 (Abstract only).

* cited by examiner

US 10,718,674 B1

FRACTO-MECHANOLUMINESCENT (FML) CRYSTALS-ENHANCED OPTICAL FIBER-BASED IMPACT SENSOR MODULE

CROSS-REFERENCE TO RELATED APPLICATIONS

This application claims priority to and the benefit of the filing of U.S. Provisional Patent Application No. 62/599,629, entitled "Fracto-Mechanoluminescent (FML) Crystals-Enhanced Optical Fiber-Based Impact Sensor Module", filed on Dec. 15, 2017, the specification, appendices and attachments to, and claims of which are incorporated herein by reference.

BACKGROUND OF THE INVENTION

Field of the Invention (Technical Field)

The present invention is related to impact sensors for structural composites.

Background Art

Note that the following discussion may refer to a number of publications and references. Discussion of such publications herein is given for more complete background of the scientific principles and is not to be construed as an admission that such publications are prior art for patentability determination purposes.

One of the most advanced sensor technologies that is widely used for impact detection and localization for structural composites, particularly in aerospace structures, is a piezoelectric material-based sensor network utilizing the pitch-and-catch sensing mechanism. This system requires an external electrical source to active piezoelectric actuators for emitting surface-guided waves to interrogate the surface or near-surface of the structural composites and acquire signals from the piezoelectric sensors. This requires a constant energy supply for executing interrogation of the structural composites for damage detection. Due to this intrinsic sensing mechanism, the piezoelectric-based sensor network has limitations as a sensor technology for structural health monitoring (SHM), which implements real-time damage detection technologies. Furthermore, because the piezoelectric-based sensor network uses surface guided waves, damage occurrence below the surface of structural composites cannot be detected. There is a need for a sensor technology that can provide 3D impact sensing performance from anywhere within a structural composite, not just at the surface, without requiring constant power, heavy computational costs, and long data processing times.

SUMMARY OF THE INVENTION (DISCLOSURE OF THE INVENTION)

The present invention is an assembly for detecting strain or strain rate in a composite, the assembly comprising a composite; one or more sensor nodes, each sensor node comprising a fracto-mechanoluminescent (FML) material encased in an optically transparent material; one or more photodiodes; and one or more optical conductors for transmitting light emitted by the FML material in each sensor node to one of the photodiodes. The FML material preferably comprises one or more $EuD_4TEA$ crystals. The transparent material preferably comprises polydimethylsiloxane. The optical conductor preferably comprises an optical fiber. The composite preferably comprises a honeycomb composite and the transparent material is preferably disposed within a cell of the honeycomb composite. The assembly preferably further comprises a reflective material disposed between the optically transparent material and one or more interior surfaces of the cell. The reflective material preferably comprises a biaxially-oriented polyethylene terephthalate film and preferably either surrounds the optically transparent material or lines the one or more interior surfaces of the cell. The composite is optionally selected from the group consisting of structural composite, fiber-reinforced polymer composite, and fiber-reinforced plastic composite. The intensity of the light emitted by the FML material is preferably related to a magnitude of strain or strain rate experienced by the composite. The intensity of the light emitted by the FML material is also preferably related to the distance of the FML material from the surface of the composite that receives an impact. A plurality of sensor nodes disposed at different distances from the surface preferably provides a three-dimensional map of damage experienced by the composite. The assembly preferably further comprises a high speed video camera or high frame rate camera to capture the light emitted by the FML material.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures.

7A) and compressive strains (FIG. 7B) are shown in time domain for the six representative test data with six different shot pressures. FIG. 7C shows mean value and the standard error of the mean (error bars) of the strain rate vs. shot pressure from all tested 23 EuD$_4$TEA-PDMS specimens.

FIG. 8A shows that the total population of pixel and pixel values in the cropped 12-bit grayscale images were profiled to calculate one bright pixel count ratio (BPCR) for each frame. FIG. 8B shows for six representative test cases the BPCR representing FML light brightness in time.

FIG. 11A shows the 23 mean BPCR data as a function of high strain-rate compressive strain rates of the 23 test cases. FIG. 11B shows six sets of the mean BPCR data grouped and presented with error bars for the six test cases with six different shot pressures.

DETAILED DESCRIPTION OF EMBODIMENTS OF THE INVENTION

Embodiments of the fracto-mechanoluminescent (FML) impact sensor module of the present invention can sense energy transferred from external mechanical stimuli under low, medium, or high strain-rate compressive loadings (e.g., impact, blast, and fatigue). If a sensor network comprising FML impact sensor modules is embedded in a structural composite during manufacturing, users can gain comprehensive information, such as three-dimensional localization and quantification of damage severity, used for diagnosis and prognosis of damage. The present invention requires a low energy supply and low computational cost for processing of sensor signals.

Figure 1:
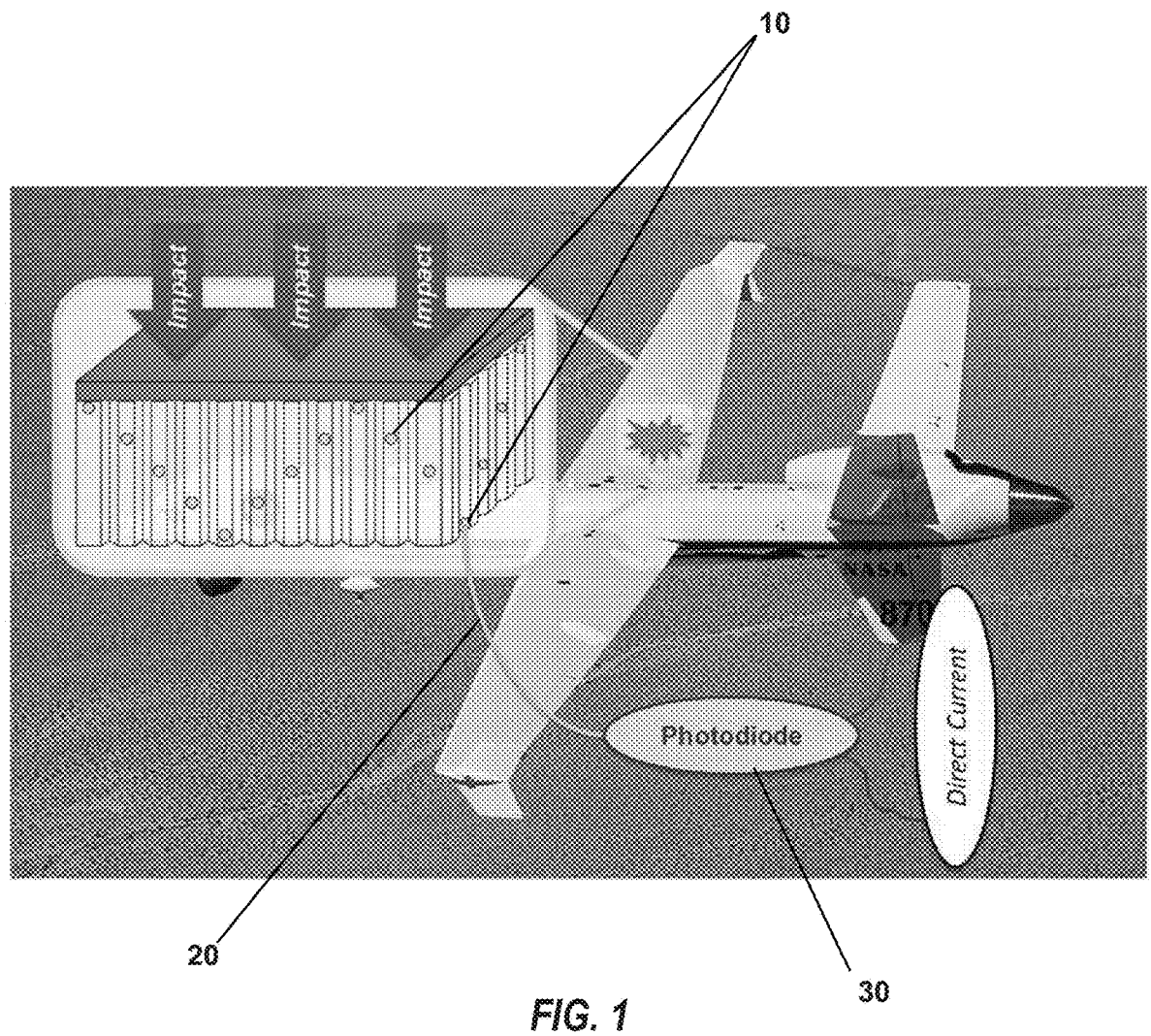
FIG. 1 is a schematic of an embodiment of the present invention.

The FML impact sensor module preferably comprises an FML europium tetrakis(dibenzoylmethide)-triethylammonium (EuD$_4$TEA) crystal-embedded elastomeric self-sensing composite comprising at least one FML EuD$_4$TEA crystal 10 as a sensor node, one or more optical fibers or other optical conductors 20 for transferring FML photonic signals, and one or more photodiodes 30 in a preferably photodiode-based data acquisition system, optionally comprising an Arduino-based data processing unit. A schematic of such a system is shown in FIG. 1. Once EuD$_4$TEA crystals are synthesized, polydimethylsiloxane (PDMS), a silicone-based transparent elastomer, preferably encases the EuD$_4$TEA crystals. Because PDMS is optically transparent, it transmits light emission from EuD$_4$TEA with minimum loss to the optical fiber. Although other preferably transparent materials may be used depending on the structural composite material to be used, or for any other manufacturing reason, other advantages of PDMS include mechanical resiliency and elasticity, low cost, and facile manufacturability—any shape can be easily made without expensive equipment.

Figure 2:
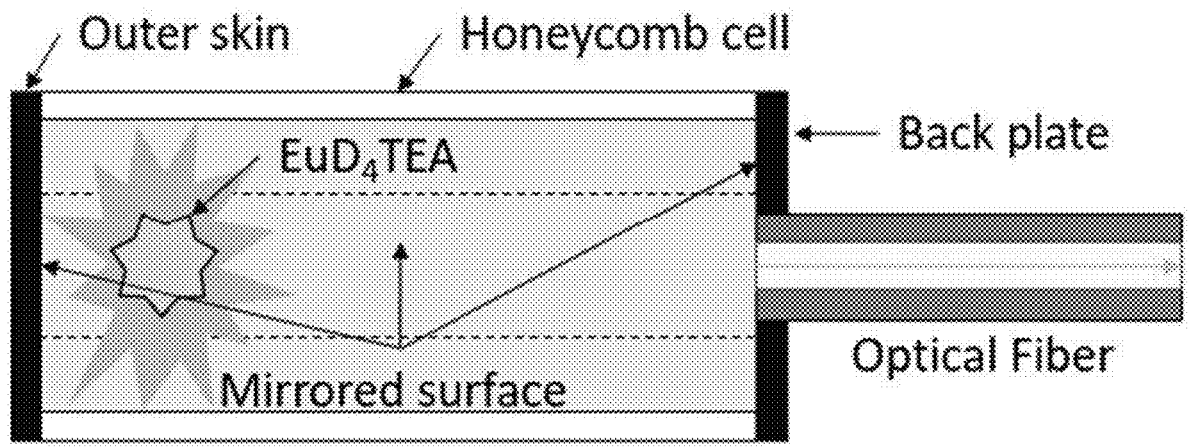
FIG. 2 is a cross-sectional schematic of an impact sensor module of the present invention.
Figure 3:
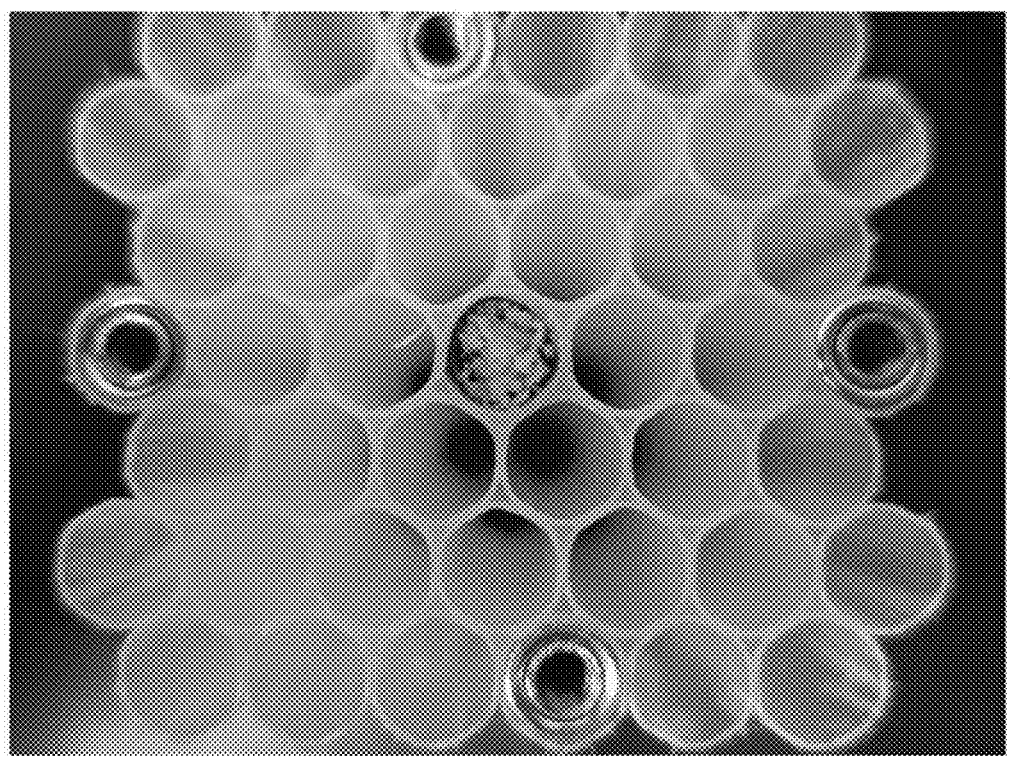
FIG. 3 is a photograph of $EuD_4TEA$-PDMS self-sensing composites embedded in a cell of honeycomb-cored structure.

EuD$_4$TEA-PDMS self-sensing composites of the present invention exhibit light emission characteristics under high strain-rate compressive loadings (i.e., simulated impact/blast loading). The intensity of light emitted from the EuD$_4$TEA-PDMS self-sensing elastomeric composites correlates with the magnitude of compressive strain and strain rate. The EuD$_4$TEA-PDMS self-sensing composites are preferably wrapped in Mylar (also known as BoPET or biaxially-oriented polyethylene terephthalate) or another reflective material for minimizing leakage of light emitted from the sensing composites resulting from impact and/or blast events. Alternatively each honeycomb cell can be lined with the reflective material. In at least one embodiment of the present invention as shown in FIGS. 2 and 3, the Mylar-wrapped EuD$_4$TEA-PDMS self-sensing composite can be inserted in cells of a honeycomb-cored structural composite, since the cells in the honeycomb core are vacant. This is preferably performed during manufacture of the structural composite. The composite may be otherwise embedded in a structural composite. The Mylar-wrapped EuD$_4$TEA-PDMS self-sensing composites of the present invention can then preferably interface with an optical fiber in a non-contact manner. The optical fiber preferably guides the FML light emission from the self-sensing composites to a photodiode in the data acquisition and processing unit that converts the photonic signal to an electrical signal for quantifying the intensity and wavelength of FML light.

Embodiments of the present invention are minimally invasive and do not appreciably affect structural integrity of the structural composite, since they preferably occupy empty space within the structural composite. Furthermore, by adjusting the depth of the EuD$_4$TEA sensor node within the cell, impact energy at different locations can be measured. This enables 3D impact sensing with EuD$_4$TEA sensor nodes located at various spatial locations and depths in the sensor network, enabling great configuration flexibility. Measurement can be performed without sacrificing mechanical performance or requiring external electrical energy for activating sensing nodes. In at least one embodiment, the EuD$_4$TEA-based elastomeric self-sensing composites can be embedded in structural composites such as a polymer matrix fiber-reinforced polymer or fiber-reinforced plastic (FRP) composite. Given the non-adhesive connection between the sensor node and optical fiber, it is preferable that the sensor nodes are configured so the sensor module can be reused, which can significantly reduce cost, by easily replacing the sensor nodes after damage occurs. Furthermore, a 3D sensor network of the present invention is preferably capable of performing 3D impact and/or blast damage detection by providing 3D damage localization and quantification information, unlike other sensor technologies. Composite sensors of the present invention exhibit enhanced robustness and immunity from environment factors, since they are embedded within the structural composite.

The honeycomb-cored structural composite is a commonly used structural component in aerospace industry. Additionally, with suitable modification of the sensor node design to ensure light from each node can be transmitted via optical fiber, the FML impact sensor network of the present invention can perform 3D damage detection of any structural composites, such as FRP composites, in the event of external dynamic mechanical stimuli (e.g., impact, blast, and fatigue). FRP composites are very susceptible to externally applied mechanical stimuli at high strain-rate, resulting in damage occurrences at and/or below the surface. However, sensor technologies that can detect damage on the in-plane surface and in through-the-thickness locations of the FRP structural composites are not available; impact is mostly detected at and/or near the surface, not three dimensionally. This makes the sensor network of the present invention useful for commercial airliners, defense and military programs, reusable aerospace industries (e.g., SpaceX, Blue Origin, and Virgin Galactic), automobile companies (e.g., Tesla, BMW, Toyota, and Volkswagen), and innovative transportation companies (e.g., Hyperloop), among many other applications.

Circuit for Data Acquisition

Figure 4:
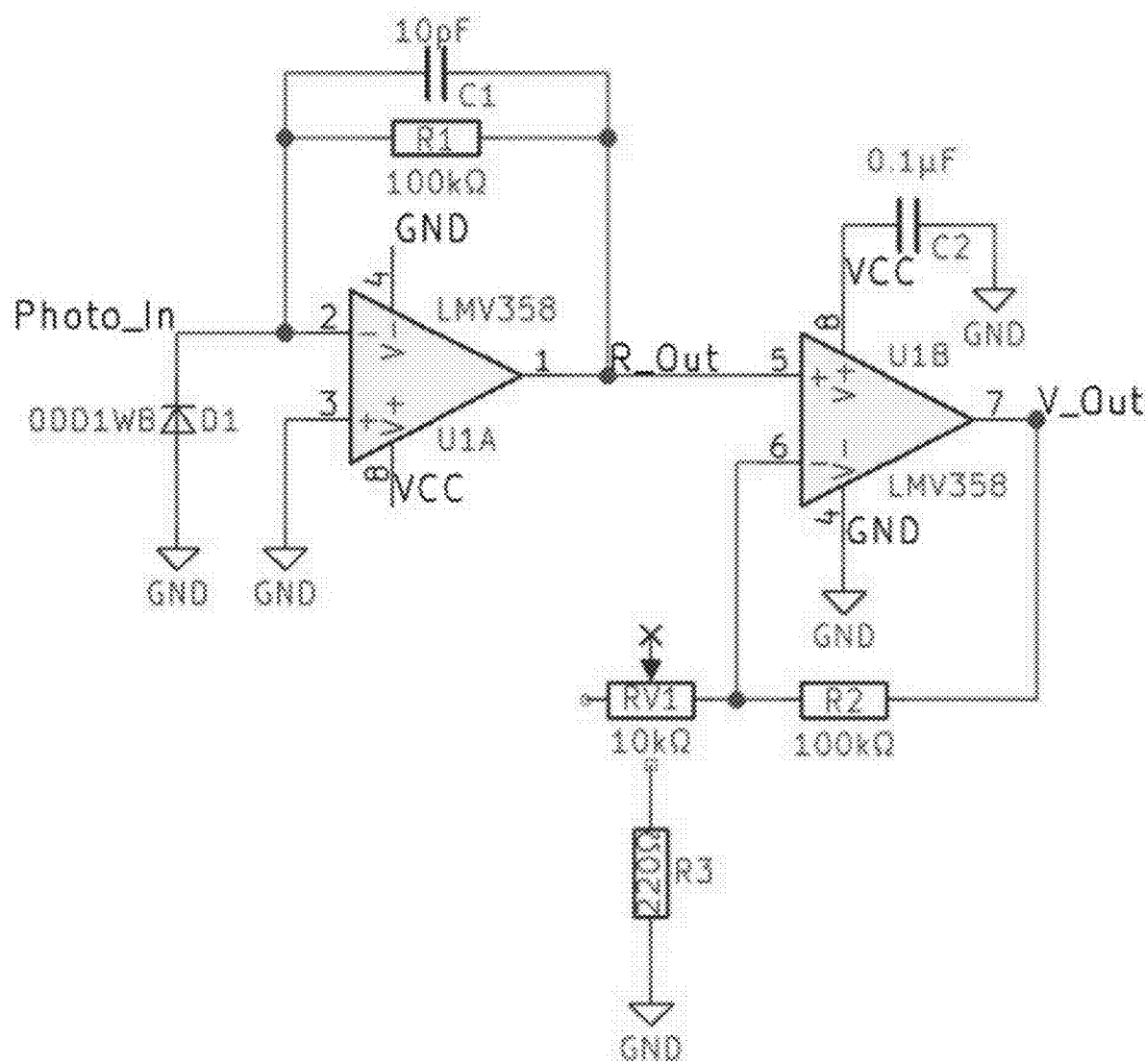
FIG. 4 is an example data acquisition circuit to detect the guided FML light emitted from $EuD_4TEA$ and ATD converter.
Figure 5A:
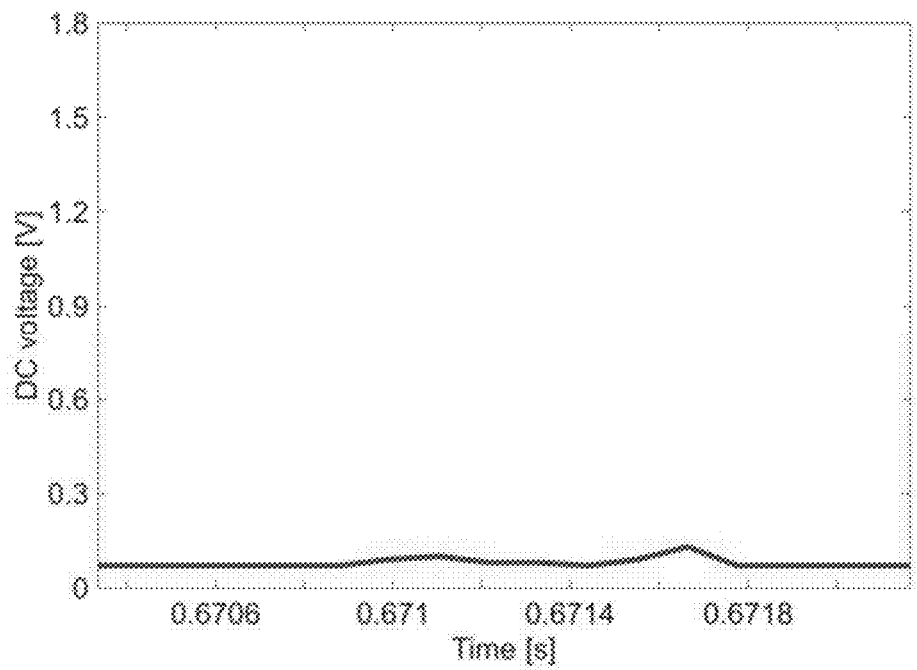
FIGS. 5A-5D show the voltage output for the embodiment of the present invention described in Example 1 shown in the time domain for sample 23 at minimum impact energy with plate (FIG. 5A), sample 20 at maximum impact energy with plate (FIG. 5B), sample 15 at minimum impact energy without plate (FIG. 5C), and sample 21 at maximum impact energy without plate (FIG. 5D).
Figure 5B:
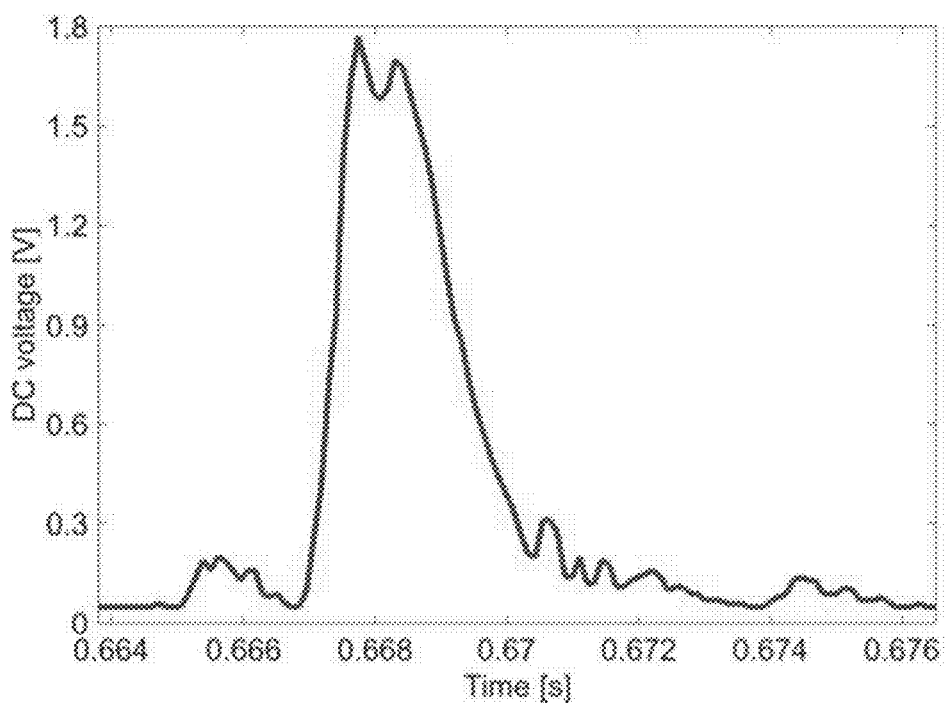
Figure 5C:
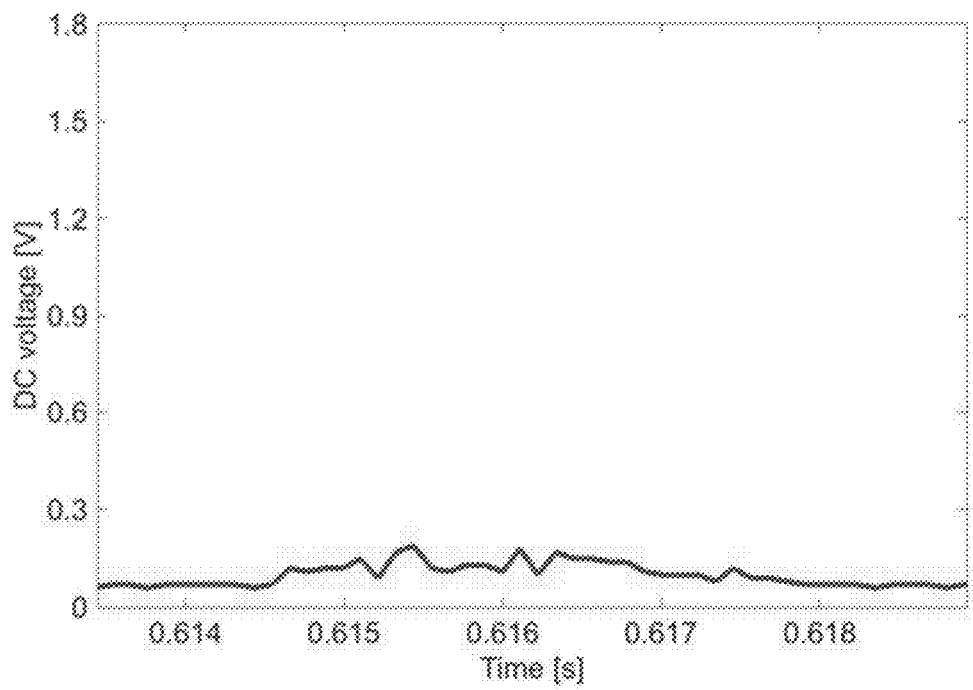
Figure 5D:
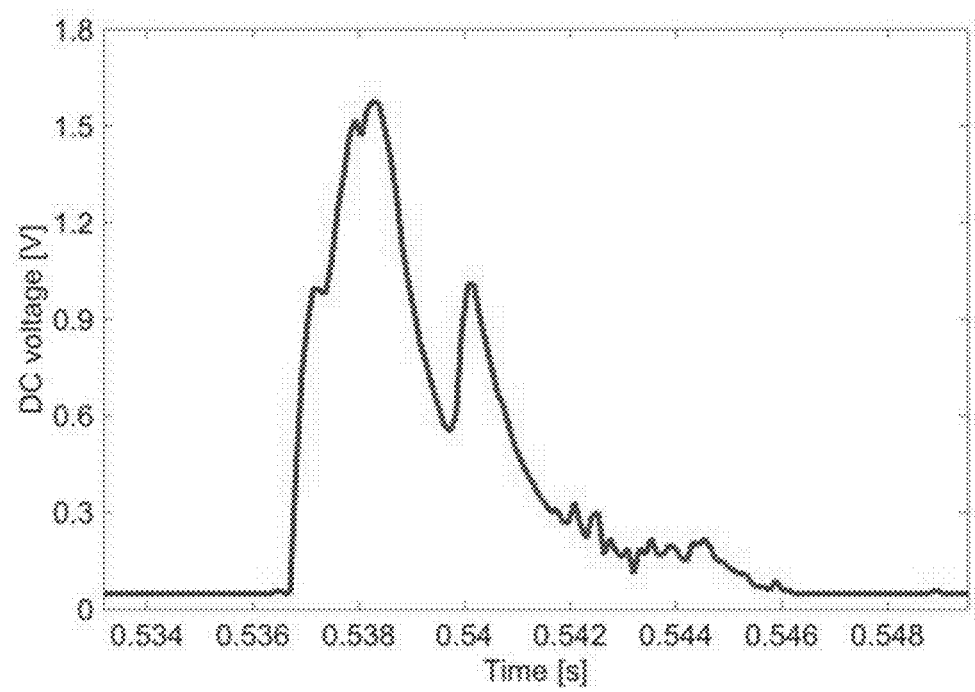

One example of a circuit to convert and amplify the analog voltage output from the photodiode is shown in FIG. 4. A low power operational amplifier (opamp) was used to amplify the signal from the photodiode to a useable level. The opamp is preferably a single-supply, single + input (rather than both + and − inputs), and preferably runs on 5 Volts. Furthermore, to maintain accuracy and detection range, the opamp is preferably to be rail to rail capable with zero-drift and, to save space, has two amplifiers per chip. To meet all desired requirements, the AD88629 manufactured by Analog Devices was chosen. The AD8629 chip was housed in a surface mount Small Outline Integrated Circuit (SOIC) package, requiring an adaptor board to convert the layout to Dual in-line Package (DIP) to be used in circuit testing. This DIP breakout board was used as the footprint for the chip in the printed circuit board (PCB) design. Additional traces and components were added to simplify the data recording initialization circuit down onto a single board. The first opamp was configured as a transimpedance amplifier to convert the signal from the photodiode from current to voltage. The output of the first amplifier was run to the positive input of the second amplifier, which was built with a tunable gain using the 10 kΩ potentiometer. The gain was then tuned with an orange LED so that the maximum possible output of the photodiode was set to 5 volts. The voltage output from the reader module PCB was output to the data acquisition system. This system started with an Arduino MEGA 2560 microcontroller with a mega-proto shield and ethernet shield stacked on top. The ethernet shield was for the SD card slot for nonvolatile data storage. The proto shield prevented the Ethernet shield from contacting certain components on the base Arduino board. In order to capture light emission data, a sample rate of 8,900 Hz was calculated. The Arduino Mega analog input channels were tied to a 10-bit analog-to-digital (ATD) converter. This 10-bit value represents 1,024 increments of 0.005 volt, for 0-6 volts, and was stored as a 16-bit variable.

Example 1

Figure 6A:
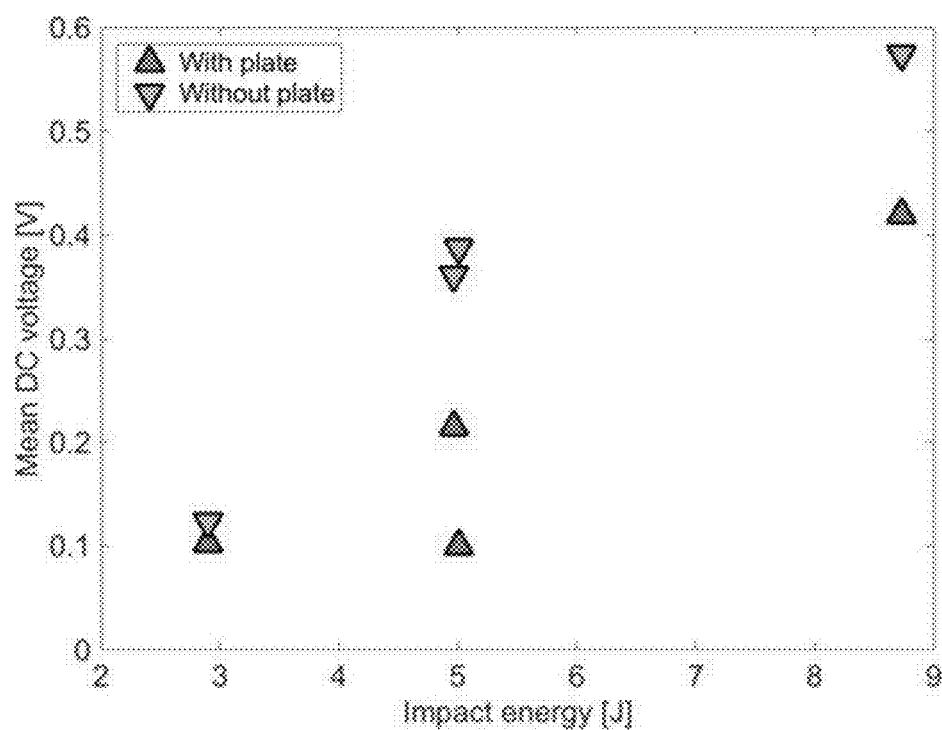
FIGS. 6A-6B show mean voltage data calculated from the tests described in Example 1. Testing with and without plate are shown along with the impact energy (FIG. 6A) and the final velocity of the impact hammer (FIG. 6B).
Figure 6B:
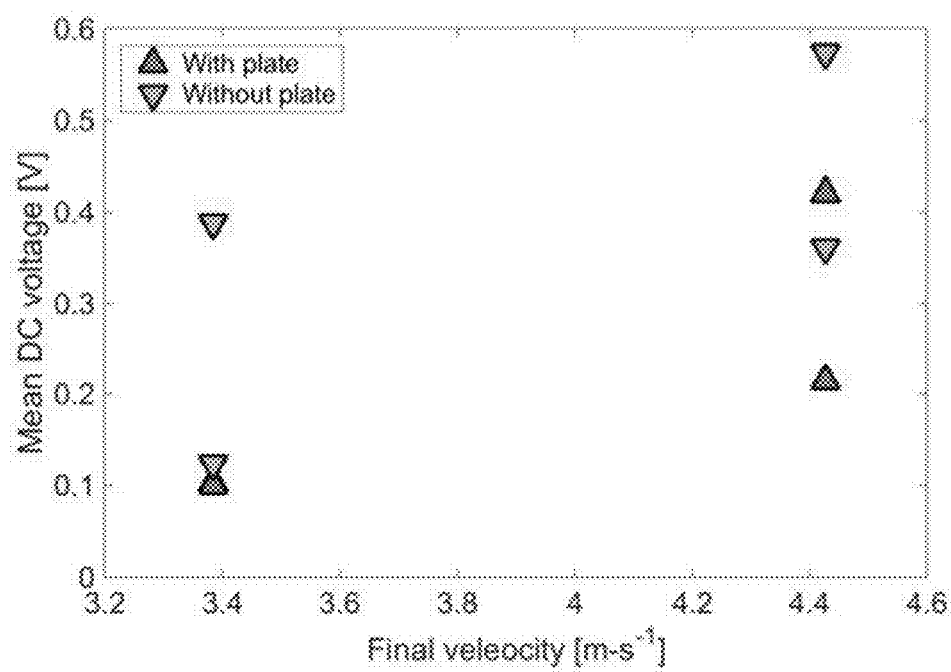

FIGS. 5A-5D show the representative sensor outputs at minimum and maximum impact energy from drop impact hammer tests with and without an aluminum top plate on a 76.2 mm×76.2 mm block of test composite comprising a 50.8 mm thick high-density polyethylene (HDPE) honeycomb core. An inner cell was lined with Mylar, and 62 mg of EuD$_4$TEA crystals were added to the cell, which was then filled with a PDMS mixture. There are notable similarities between the sensor output with and without the aluminum top plate. The dips in the signal are caused by the impact hammer bouncing against the sample and causing more crystals to fracture. The mean output voltage was collected by averaging all of the data points above the threshold line. The threshold data was collected by a subroutine of the data acquisition system that runs before the test is ready. This subroutine takes 100 readings and returns either the average of the data or the highest noise value, whichever is larger. Any major discrepancy between the average and max noise is discarded and the trial run again. FIGS. 6A-6B show the mean voltage data plotted with the impact energy and the velocity for all the tested cases. Between the two plots it can be seen that there is an outlier in the "with plate" data. This outlier is assumed due to attenuation of the applied impact energy by wall of the cell with the sensor module. It was observed that the outlier sample showed a crushed wall after the testing. There is a clear linear trend, if the outlier sample is removed, between the mean voltage and the impact energy. However, there is no significant trend between the mean voltage and the final velocity of impact hammer.

Example 2

Synthesis of EuD$_4$TEA FML crystals began from preparing a Europium(III) nitrate hydrate (ENH)/dibenzoylmethane (DBM)/trethylamine (TEA) solution in acetone. 8 mmol (=3424.34 mg) of ENH, 26 mmol (=5942.86 mg) of DBM, and 28 mmol (=3.9 mL) of TEA were added into 160 ml of acetone and manually stirred for 2 minutes without heating. Then, the solution was heated at about 40° C. and stirred at about 200 rpm for about 60 minutes on a hot plate. The solution was removed from the hot plate and covered with a paraffin film, which has a hole to allow slow evaporation of acetone at room temperature for about 48 hours. This slow acetone evaporation process is intended to allow EuD$_4$TEA to form millimeter-size pellets as it crystallized. It should be noted that the evaporation time duration needs to be adjusted depending on the total volume of acetone. Precipitation of EuD$_4$TEA crystals was observed about 4 hours after the room temperature evaporation is initiated. As time progresses, the size of the EuD$_4$TEA crystal increases while more crystallization seeds are formed about 24 hours after evaporation began. Finally, the EuD$_4$TEA pellets were obtained after filtering out the EuD$_4$TEA crystals from the remnant acetone and drying the EuD$_4$TEA crystals at room temperature in a desiccator.

EuD$_4$TEA-PDMS composites were fabricated by embedding the synthesized FML EuD$_4$TEA crystals in a PDMS elastomeric matrix. First, a PDMS mixture was prepared by mixing PDMS base and curing agents by 10:1 weight ratio and degassing it in a desiccator. The PDMS mixture was poured into a polyvinyl chloride (PVC) mold (height=10 mm and inner diameter=33 mm) up to about 5 mm height. The half-filled PVC mold was cured (annealed) in a vacuum oven at about 80° C. for about 90 min. Then about 60 mg of EuD$_4$TEA pellets were placed on the center of the solidified PDMS. Third, the PDMS mixture was poured over the EuD$_4$TEA pellets on the top of the cured PDMS bottom layer to fill up the mold completely. Excess PDMS mixture was removed by scraping with a razor blade to make the surface of the EuD$_4$TEA-PDMS composites flat. The PVC mold, completely filled with PDMS mixture, was cured at about 80° C. in the vacuum oven for about 90 min. As a result, a total of 23 cylindrical EuD$_4$TEA-PDMS composites were fabricated that have 10 mm height and 33 mm diameter, each of which contains about 60 mg of EuD$_4$TEA at the center and mid-height.

A typical compression Kolsky bar arrangement consists of three long slender solid bars (i.e., striker, input, and output bars), the high-speed camera, and a pressure vessel. Using a modified compression Kolsky bar setup, a total of 23 identical EuD$_4$TEA-PDMS specimens were tested by varying the air pressure to launch a striker bar, as shown in Table 1. For each of the six test cases, at least three specimens were tested to ensure reproducibility. The specimen was placed between the input and output bars. Ambient light was blocked by encasing the test specimen in a box having a window, through which the high-speed camera observes FML light emission. A dual level trigger wired to the strain gages on the input bar was set on the data acquisition system so that the camera can autonomously record FML light emission from the EuD$_4$TEA-PDMS specimens at the moment of impact Strains on the input and output bars were measured from the instrumented strain gages at 10 MHz for 10 ms immediately before the impact happens. To capture FML light emission, 12-bit grayscale high-speed video using a Phantom v711 grayscale high-speed camera was recorded at 50,000 frame per second (fps).

TABLE 1

|  | Test case | | | | | |
| --- | --- | --- | --- | --- | --- | --- |
|  | KB6 | KB9 | KB11 | KB12 | KB13 | KB15 |
| Number of specimens | 3 | 3 | 3 | 7 | 3 | 4 |
| Shot pressure [kPa] | 41.37 | 62.05 | 75.84 | 82.14 | 89.63 | 103.4 |
| Mean strain rate [☐·s$^{-1}$] | 912.3 | 1182 | 1465 | 1433 | 1451 | 1464 |

Figure 7A:
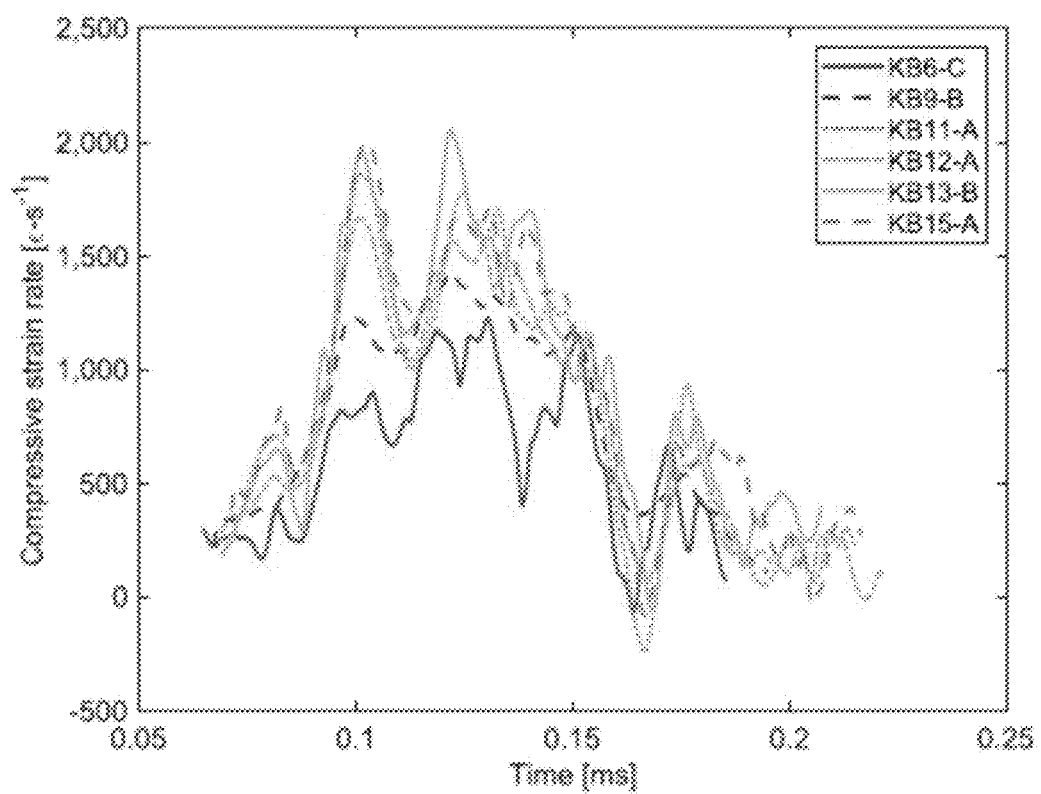
FIGS. 7A-7C show test results from the six representative tests of Example 2 with six different shot pressures ranging from 41.37 kPa to 103.4 kPa. Compressive strain rates (FIG.
Figure 7B:
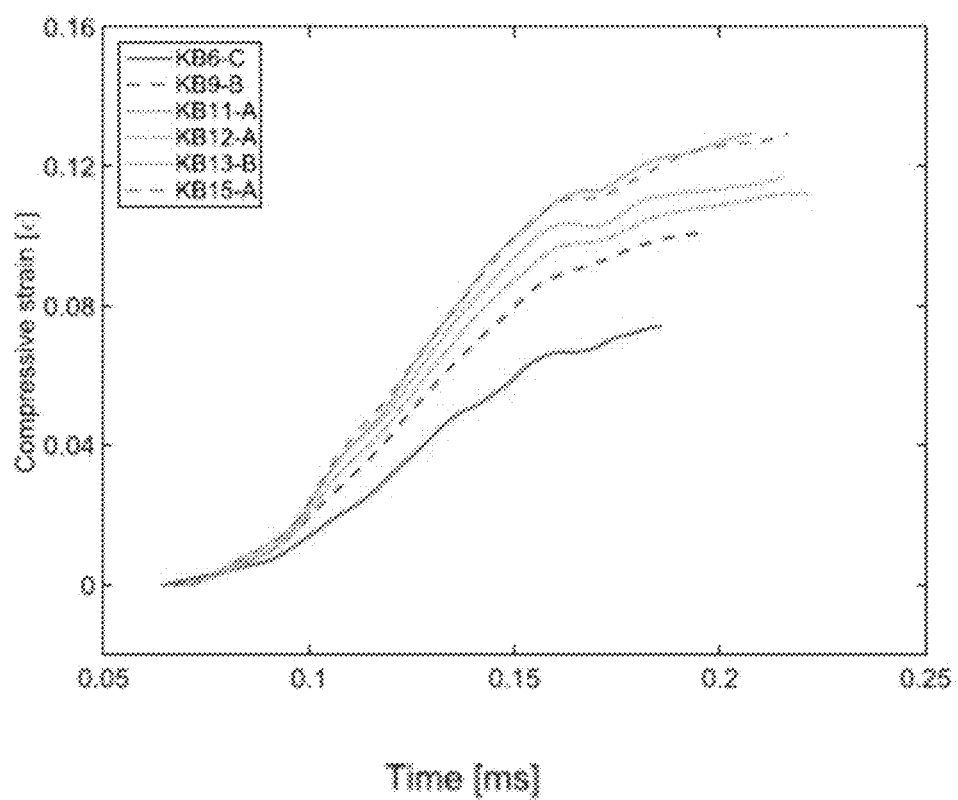
Figure 7C:
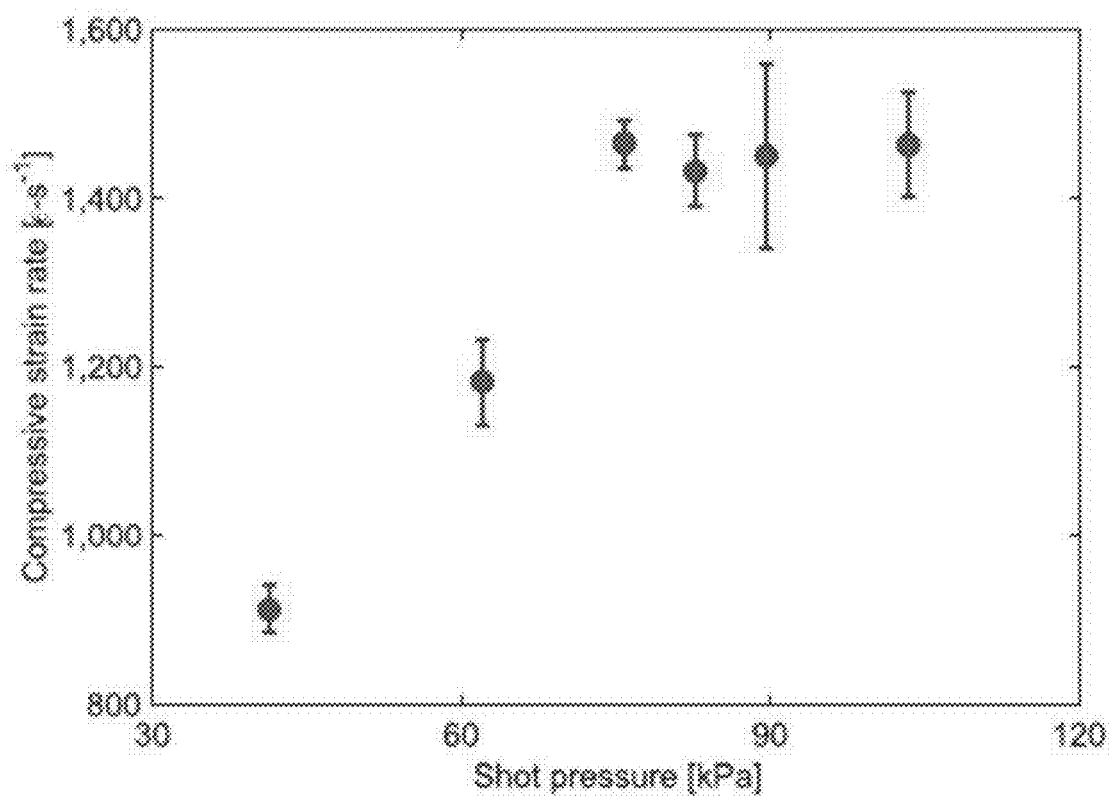

The striker shot from the pressure vessel onto the end of the input bar generates a compressive stress pulse upon impact. This wave travels to the specimen where a portion of the wave is transmitted through the specimen into the output bar, and a portion is reflected back into the input bar. Based on this 1D elastic wave propagating through the input bar, the EuD4TEA-PDMS composites specimen, and the output bar, two constitutive parameters (compressive strain rate and strain) were acquired in the specimen during the FML light emission characterization testing. First, the compressive strain rate was calculated using:

$$\dot{\varepsilon}_s(t)=(c_{in}/l_s)(1-A_{in}/A_{out})\varepsilon_i(t)-(c_{in}/l_s)(1+A_{in}/A_{out})\varepsilon_r(t)$$

where, $c_{in}$ is the elastic wave speed of the input bar under 1D stress conditions, $l_s$ is the initial length of the specimen, $A_{in}$ and $A_{out}$ are the cross-sectional areas of the input and output bars, respectively. $\varepsilon_i(t)$ and $\varepsilon_r(t)$ are the strain pulses incident upon and reflected from the specimen, respectively. Six representative strain rate data are presented for about 0.15 ms in FIG. 7A. Each plot shows one representative result from each test case conducted at a constant shot pressure. It can be seen that overall strain rate in the range from 0.1 to 0.15 ms increases as the shot pressure increases for the low shot pressure test cases (i.e., KB6, KB9, and KB11) while strain rates from the test cases at high shot pressures (i.e., KB12, KB13, and KB15) do not show a significant difference. The compressive strain ($\varepsilon_s(t)$) in the test specimen can be calculated by integrating the strain rate ($\dot{\varepsilon}_s(t)$) with respect to time. FIG. 7B shows the six representative compressive strain plots in the time domain for about 0.15 ms. The least-square linear best-fit line was overlaid in the linear region between 0.1 and 0.15 ms. The slope of the least-square linear best-fit line was regarded as the compressive strain rate for each test FIG. 7C shows the mean value of the compressive strain rates, which were acquired from high strain-rate compressive loading tests for the 23 EuD$_4$TEA-PDMS specimens, with various shot pressures. Here, the error bars represent the standard error of the mean (SEM) from the mean compressive strain rate. It can be observed that the mean strain rate increases with the magnitude of the air pressure to launch the striker bar up to 75.84 kPa (i.e., KB11). For the cases with the shot pressure higher than 75.84 kPa, one can see that strain rate is barely affected by the increased shot pressure. Based on the observations of the constitutive parameters acquired from high strain-rate compressive loading test, it can be seen that the EuD$_4$TEA-PDMS composites specimens experience maximum strain (i.e., about 13%) during the testing with shot pressure greater than 75.84 kPa. Meanwhile, one can expect to adjust the maximum compressive strain and strain rate by varying shot pressure that is smaller than 75.84 kPa.

Figure 8A:
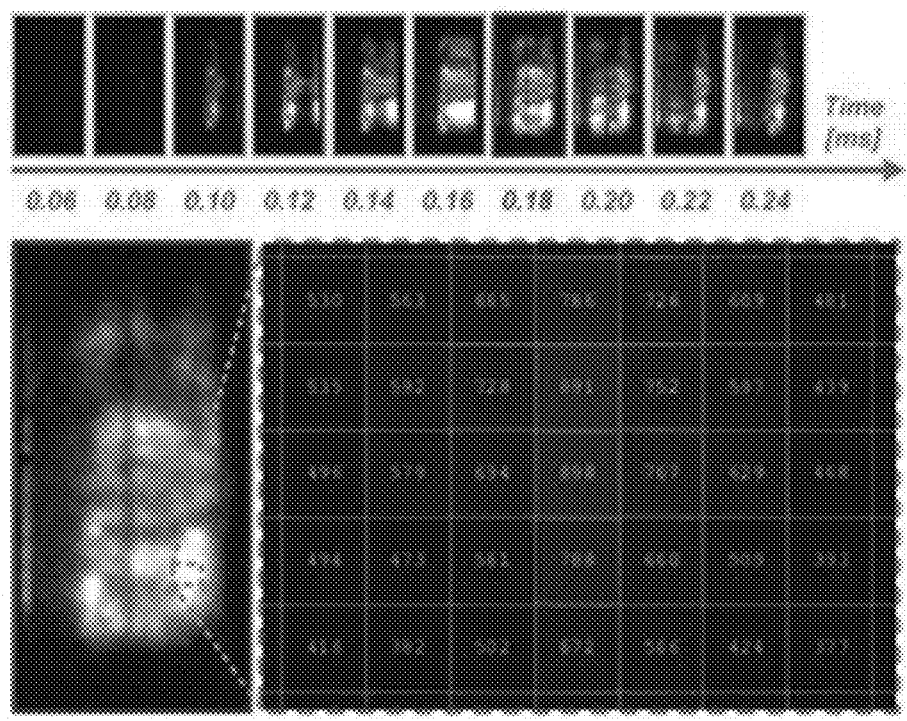
FIGS. 8A-8B show quantification of FML light emission from the EuD$_4$TEA-PDMS composites of Example 2 performed by processing high-speed images.
Figure 8B:
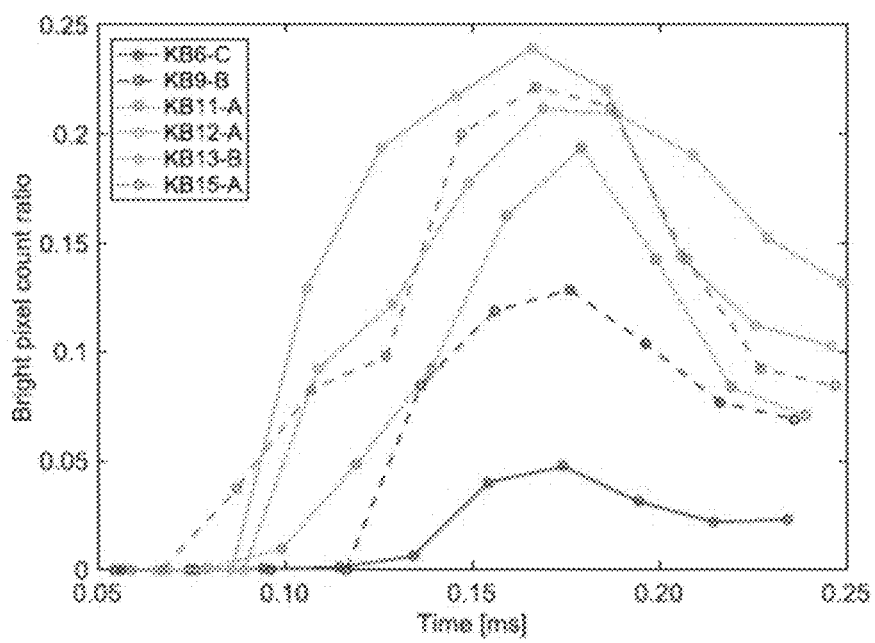

An image processing technique was implemented to characterize FML light emitted from the EuD$_4$TEA-PDMS composites under high strain-rate compressive loading, as shown in FIG. 8A. During each high strain-rate compressive Kolsky bar test, 12-bit grayscale high-speed video with a resolution of 256×128 was recorded at a rate of 50,000 fps to capture FML light emission. First, the videos were exported to sequences of a total of 51 12-bit grayscale images that started at the camera trigger and spanned all frames of FML light emission. To minimize computational cost for the image processing, the exported images of frames were cropped to 32×64 images that contained all pixels involved in the FML light emission and omitted dark background pixels. Each cropped image contained a total of 2,048 (=32×64) pixels. These sets of high-speed image sequences were processed to quantify intensity of FML light emission for each test using a MATLAB Image Processing Toolbox™. Specifically, 12-bit grayscale images were exported and then all pixels in the images were inspected to acquire pixel values using functions provided by the MATLAB™ Image Processing Toolbox™. Second, the brightness of FML light was quantified by taking into account both pixel value and population of pixels involved in FML light emission. The high-speed images obtained from all tests conducted with 23 specimens (i.e., a total of 23×51=1,173 images) were inspected. A total of 2,402,304 (=2,048×1,173) pixels were ranked in the order of the pixel value. Full range of pixel value of 12-bit grayscale image was from 0 to 4,095. Then, a threshold value was determined by choosing a pixel value of the pixel cutting off the top 23.3% of the entire 2,402,304 pixels. The 23.3% threshold value was used to sort pixels into "bright" pixels (i.e., pixels having pixel value greater than the threshold value) and "dark" pixels (i.e., non 'bright' pixels) for the 23 tests. The 23.3% threshold was selected after investigating image-processing methodologies with other percentiles ranging from 12.2% to 31.7%. Smaller or larger than 23.3% threshold values were shown to omit "bright" pixels or count "dark" pixels into pixels involved with FML light emission, respectively. Last, the total number of "bright" pixels in each frame was divided by the total number of pixels in each frame using:

$$BPCR(i)=P_{bright}(i)/P_{total}(i)$$

where, BPCR(i) is bright pixel count ratio (BPCR) in the $i^{th}$ frame, $P_{bright}(i)$ is the total number of "bright" pixel in the $i^{th}$ frame, and $P_{total}(i)$ is the total number of pixels in the $i^{th}$ frame (i.e., 2,048). This value was named as bright pixel count ratio (BPCR) and was regarded as brightness of FML light at the time when the high-speed image captured the FML light emission. The calculated BPCR data that were obtained from the six representative tests are shown in FIG. 8B.

Figure 9A:
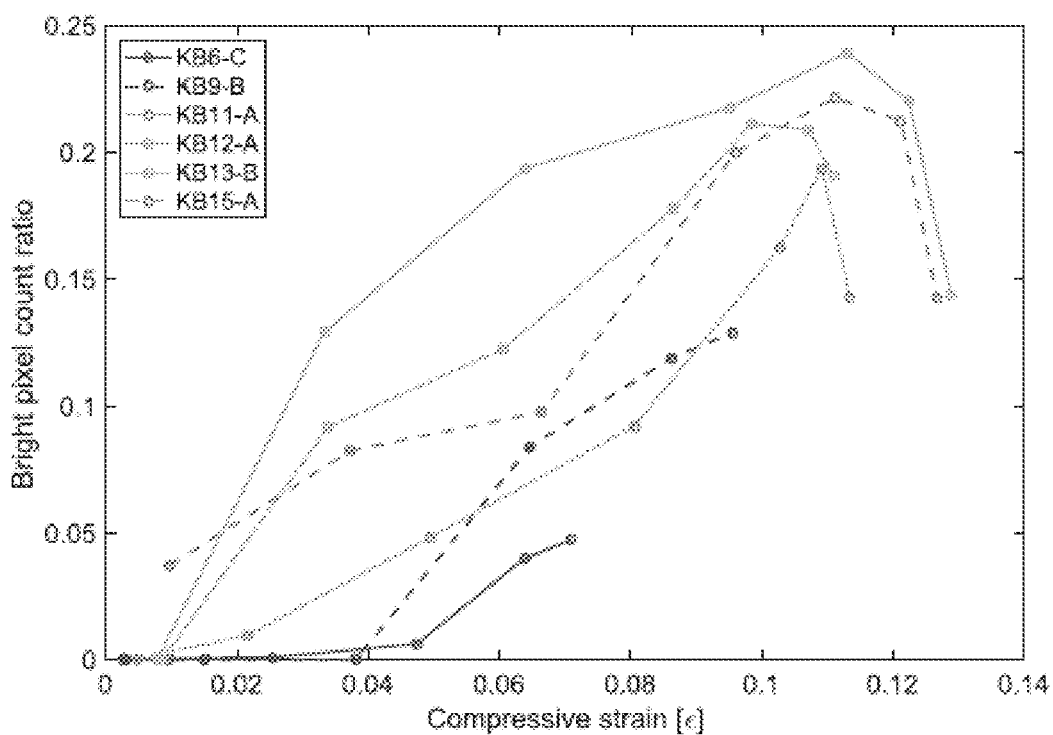
FIG. 9A shows BPCR data obtained from six representative tests at six different shot pressures and plotted with high strain-rate compressive strain for Example 2.

To understand the FML light emission characteristics of EuD$_4$TEA crystals embedded in PDMS under high strain-rate compressive loading, BPCR data (FIG. 8B) were time-synced with the compressive strain (FIG. 7B). As a result, FIG. 9A shows six representative plots of the FML light intensity (i.e., BPCR) with the high strain-rate compressive loading at various shot pressures. It should be noted that only a part of BPCR data in FIG. 8B were synced to show the FML light emission during the linear elastic regime presented in FIG. 7B from 0.10 ms to 0.15 ms. Overall, BPCR shows an increasing trend as the compressive strain increases commonly for all six representative cases up until the BPCR reaches maximum peak. It should be noted that FML light emission results from emission of photons at sites where the crystalline structures are cleaved due to the intrinsic FML mechanism. Also, it was shown that FML light emission of EuD$_4$TEA results from intramolecular electron transition from the β-ketoenolate ligand to the europium ion. In addition, it should be emphasized that EuD$_4$TEA crystals are encased with PDMS elastomer. So, it is unlikely that gas would permeate the PDMS elastomer to reach EuD$_4$TEA crystals, which can contribute to extrinsic FML light emission due to gas discharge. Based on the assumptions of the Kolsky bar setup, the calculated compressive strain represents the uniform strain distribution within the EuD$_4$TEA-PDMS specimen. Accordingly, the EuD$_4$TEA crystals embedded in the PDMS matrix were subjected to the calculated compressive strain. So, the increasing trend of the BPCR in tandem with the increasing compressive strain can be explained by the coupled relationship between the applied compressive strain onto the EuD$_4$TEA crystals, cleavage of crystalline structures, and thus electron transitions for emission of photonic energy. To clearly show the relationship between the compressive strain and the FML light intensity, in FIG. 9B, the maximum BPCR for each test case is presented with the peak compressive strain. The proportional relation between the maximum BPCR and the peak compressive strain supports that more crystalline structures are cleaved at higher compressive strain to emit more photons and exhibit higher BPCR (i.e., brighter light emission). On the other hand, in FIG. 9B it is shown that BPCR decays after reaching the maximum BPCR for the four test cases with higher shot pressure (i.e., KB11, KB12, KB13, and KB15), while the other two test cases with lower shot pressure (i.e., KB6 and KB9) do not exhibit any decay of BPCR. But, one can observe in FIG. 8B that all six test cases exhibit FML light emission decay after reaching the maximum point Based on these observations, the decay of BPCR can be explained by either complete cleavage of crystalline structures of EuD$_4$TEA when the applied compressive strain reaches to a threshold compressive strain or completion of elastic deformation. First, the decaying BPCRs seen from the four test cases with higher shot pressure in FIG. 9A can be attributed to complete cleavage of crystalline structures of EuD$_4$TEA, since even after applying higher compressive strains than about 11% in the elastic range the BPCR did not increase further. This indicates that crystalline structures of EuD$_4$TEA are depleted once they are subjected to the threshold compressive strain (i.e., about 11%). Second, for the cases where the applied compressive strain does not reach the threshold compressive strain (i.e., KB6 and KB9), the BPCR begins decaying when the specimen is not subjected to further compressive strain.

Figure 10:
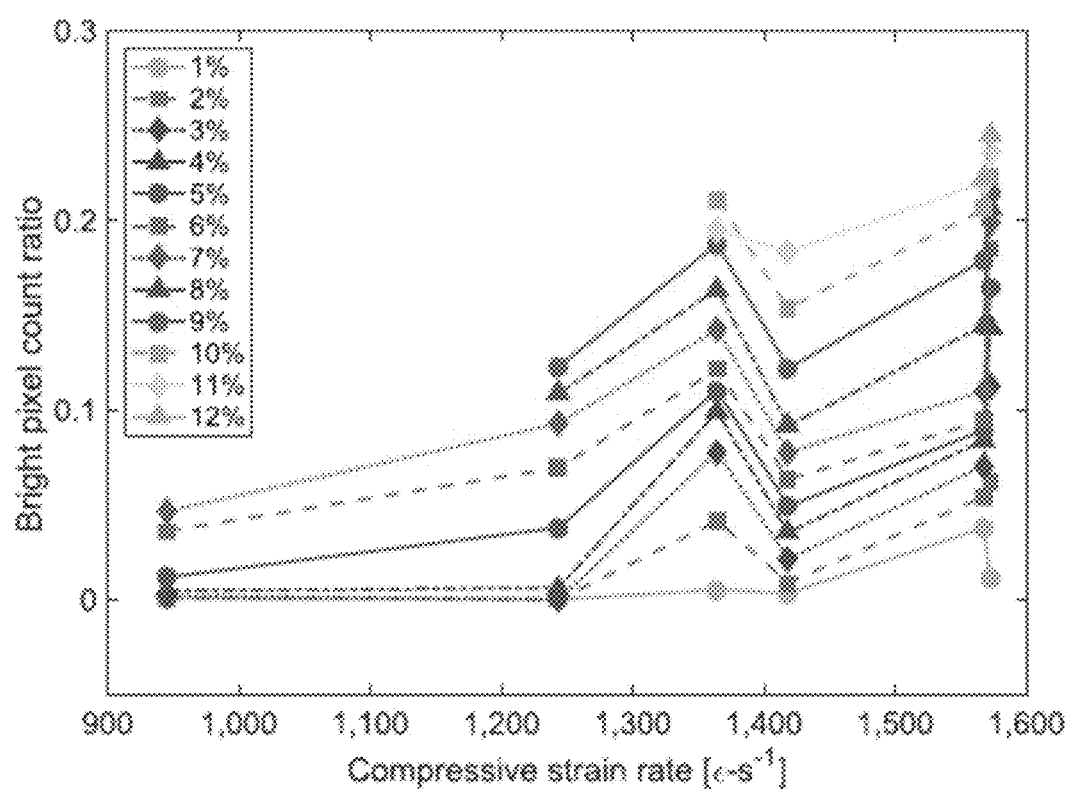
FIG. 10 shows BPCR data from the six representative test cases of Example 2 interpolated at 12 integer compressive strain levels from 1% to 12% as a function of the compressive strain rate. Both compressive strain and strain rate are shown to affect FML light emission of EuD$_4$TEA embedded in PDMS by exhibiting different characteristics of FML light emission in different ranges of the strain rate below and above about 1,300 ε·s$^{-1}$.

In addition to the observation that BPCR increases with applied compressive strain, it can be seen that there is an effect of compressive strain rate on BPCR in FIG. 9A. At one compressive strain level, BPCR varies with a test case. Each test was conducted with a different shot pressure and exhibited a different compressive strain rate as shown in FIG. 7C. So, BPCR is affected by both the compressive strain and strain rate. To show the effect of the compressive strain rate on the BPCR, 12 sets of BPCR data, each of which is acquired at a strain of 12 integer compressive strains ranging from 1% to 12%, are plotted with the compressive strain rate (FIG. 10). The presented BPCR data are estimated at the integer strain levels by interpolating the BPCR data. Interpolated BPCR data from each of the six representative test cases are grouped and presented at a compressive strain rate of each test case. There are two FML light emission characteristics under various high strain-rate compressive strain rates. First, regardless of how large strain occurs, if it is less than the threshold value (i.e., about 11%), BPCR shows increasing trend with increasing compressive strain rate. Second, the FML light emission response rate to the compressive strain increases as compressive strain rate increases. For instance, when compressive strain rate is smaller than 1,300 ε-s-1, BPCR stays at about 0 until the compressive strain reaches at 5%. On the other hand, BPCR shows faster response to the applied compressive strain if compressive strain rate is larger than 1,300 ε-s-1. In particular, for the two test cases with the highest shot pressure (and thus highest strain rates), one can observe that FML light is emitted immediately after the EuD4TEA-PDMS specimen is loaded to 1%.

Figure 9B:
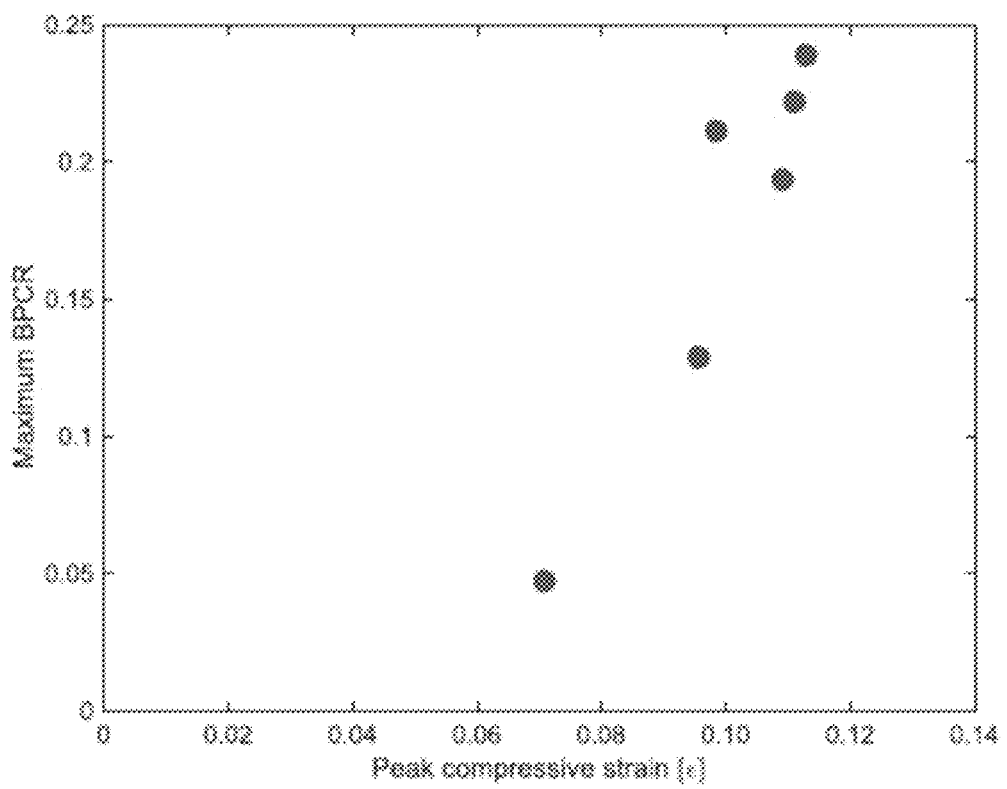
FIG. 9B shows maximum BPCRs with the peak compressive strain at which the maximum BPCRs are observed.
Figure 11A:
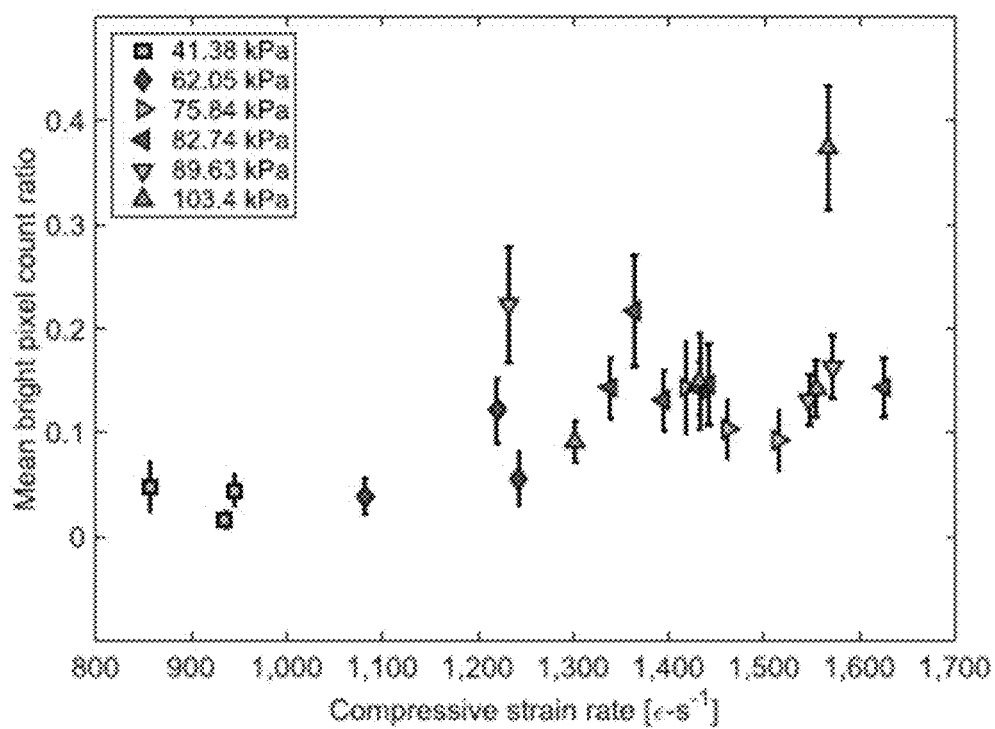
FIGS. 11A-11B show BPCR data were produced from all tested 23 specimens in the linear elastic deformation regime of the tested specimens of Example 2.
Figure 11B:
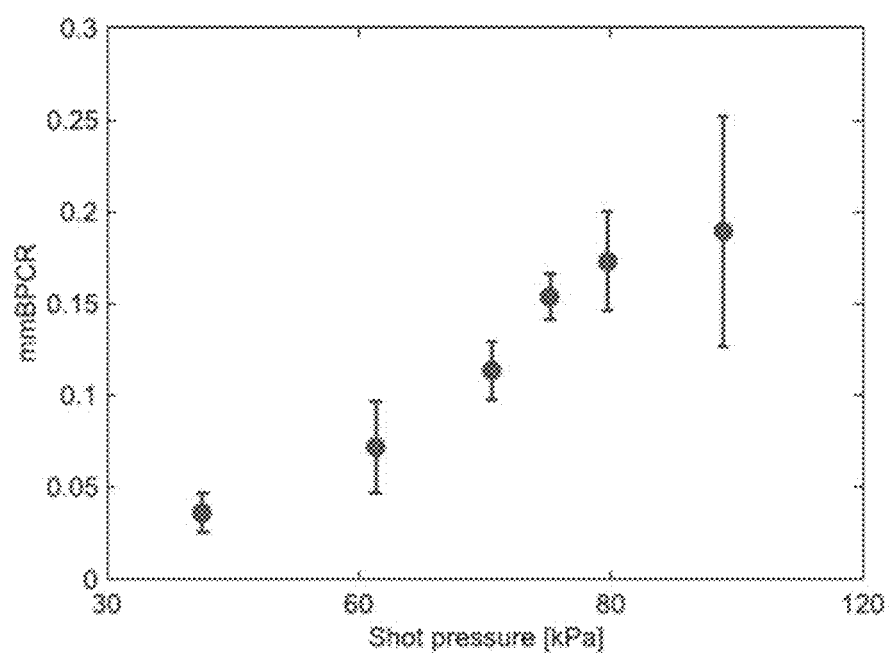

The effect of compressive strain rate was further investigated on the BPCR for all tested 23 specimens. In the elastic deformation regime, BPCR data were averaged to yield a mean BPCR (mBPCR) for each test case. In FIG. 11A, 23 error bars of the mBPCR with the standard error of the mean are shown with compressive strain rates. It can be observed that the mBPCRs are larger in the high compressive strain rate regime (i.e., greater than about 1,300 $\varepsilon\text{-s}^{-1}$) than the mBPCRs in the low compressive strain rate regime (i.e., smaller than about 1,300 $\varepsilon\text{-s}^{-1}$). Higher compressive strain occurred at a higher strain rate, thus cleaving more crystalline structures and emitting stronger light. In addition, the distribution of the BPCR data (i.e., error bar height) is larger in the high strain rate regime due to the more finely graded BPCR response to the strain as shown in FIGS. 9A-9B. To delineate the relationship between the shot pressure and intensity of the FML light emission, the 23 mBPCRs were grouped into six different sets of the six different shot pressures to produce six mean values of mBPCRs (mmBP-CRs) and SEMs of the mBPCR. Error bars of the mmBPCRs with SEM are shown at six different shot pressures in FIG. 11B. The mmBPCR increases in tandem with the shot pressure. Unlike the compressive strain rate plateauing at or above 75.84 kPa that is shown in FIG. 7C, the mmBPCR exhibits an increasing tendency up to the highest shot pressure case. This shows that there could be additional factors (e.g., dynamic responses and elastic wave propagations) that may affect FML light emission in addition to the compressive strain and strain rate.

In summary, the intensity of light emitted from the $EuD_4TEA$-PDMS composites increased as compressive strain Increases until the strain reaches about 11%. At above about 11%, FML light began decaying, which is seemingly due to complete cleavage of $EuD_4TEA$ crystals So, about 11% compressive strain is considered as a threshold compressive strain value until which $EuD_4TEA$ keeps emitting FML light in response to the compressive strain. In addition, the compressive strain rate affects FML light emission. When the compressive strain rate is at or smaller than about 1,300 $\epsilon\text{-s}^{-1}$, $EuD_4TEA$ begins emitting FML light at a compressive strain larger than 4%. On the other hand, faster and more responsive FML light emission to compressive strain was exhibited from the $EuD_4TEA$-PDMS composites when the compressive strain rate was larger than about 1,300 $\epsilon\text{-s}^{-1}$.

Example 3

Figure 12A:
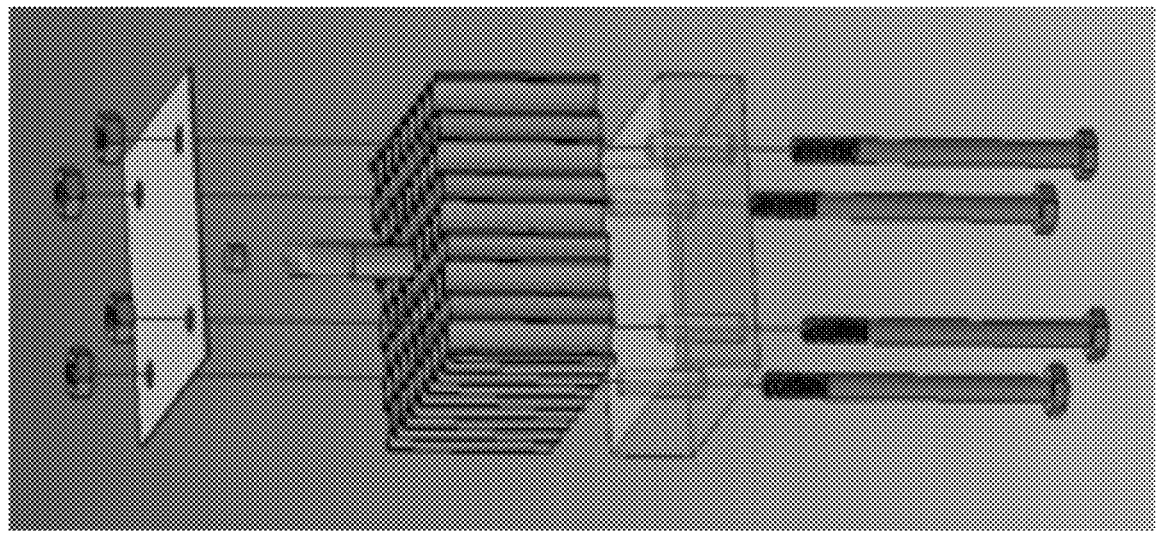
FIG. 12A is an exploded illustration of the composite test specimen of Example 3.
Figure 12B:
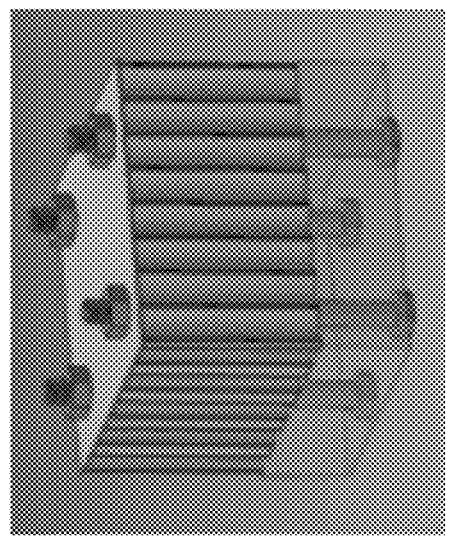
FIG. 12 B shows the assembled view of the specimen of FIG. 12A.

$EuD_4TEA$ crystals were prepared according to the method of Example 2. To produce the composites for this example, aluminum and acrylic sheets were cut into 76.2 mm×76.2 mm squares. A sleeve of aluminum foil was placed on the wall of the center cell of a polypropylene honeycomb core. The reflective material was used to reflect all light emission from the $EuD_4TEA$ so it would be visible to the high-speed camera. PDMS was then poured into the center cell to the depth at which the $EuD_4TEA$ was to be situated and cured at 40° C. for 180 min. After the first layer was cured, $EuD_4TEA$ crystals were placed inside the cell, and more PDMS is added above the crystal and then cured. The test sample was then assembled in this order aluminum plate, polypropylene honeycomb, and acrylic sheet. The assembly is then fastened together using four nuts and four bolts. These are torqued to 5 Nm for consistent preloading. Once the assembly has been fastened together, the sides of the test sample were masked to prevent any light penetration. FIG. 12A is an exploded illustration of the composite specimen, and FIG. 12B shows the assembled view. Four different specimens were prepared, each with the $EuD_4TEA$ crystals at a different depth (distance from the aluminum plate): 3 mm, 5 mm, 8 mm, and 10 mm.

Figure 13:
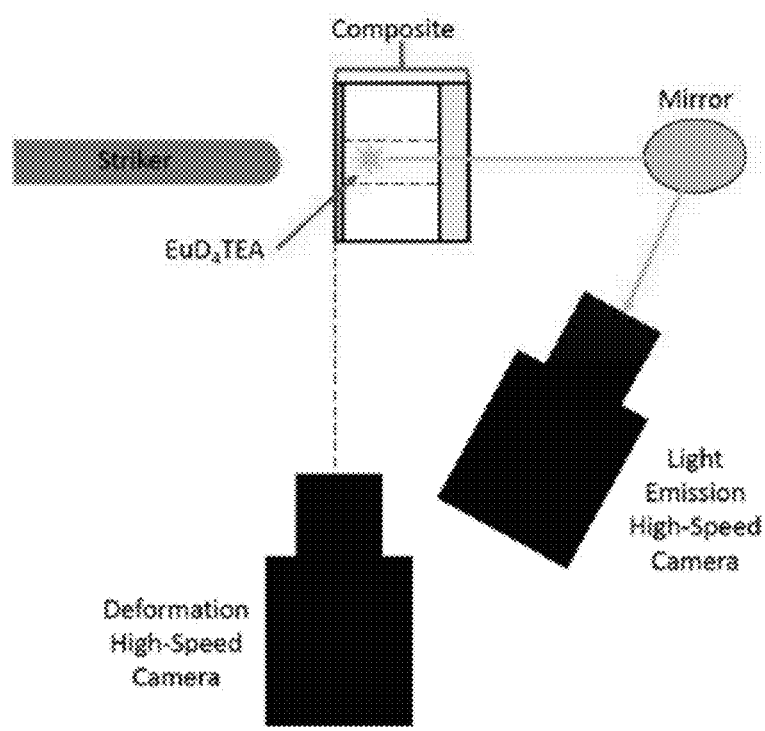
FIG. 13 shows the Kolsky bar test setup of Example 3 updated to test the three-dimensional impact self-sensing capability composite (3D-ISSC) with two high-speed cameras for measuring impact displacement as well as FML light emission intensity.

The apparatus used to test the composite is called a Kolsky bar or Split Hopkins Pressure Bar, which impacts a test sample with a projectile fired from a pressure vessel. A cylindrical steel track is attached to the pressure vessel where the projectile is loaded. A 304.8 mm long and 12.7 mm diameter steel bar with a rounded face was used as the projectile. The rounded surface relieves tensile strain to investigate the effects of compressive loading rather than tensile. The vessel was filled to a pressure of 124.1 kPa with an external compressor. The test composite was placed at the end of the steel track at a specified impact position. Since the Kolsky bar apparatus was not designed to specifically impact the test composite of this example, a special test stand was fabricated to allow the composite to be properly placed in front of the projectile track. The test stand was designed to be easily attached and removed from the Kolsky bar. The stand comprised acrylic blocks bolted together around the Kolsky bar. A small "shelf" was mounted to the front of the stand to elevate the composite to the correct impact height. The shelf also provided the ability to secure the composite to eliminate any movement during tests. The acrylic test stand, being transparent, enabled the team to observe light emission from each test A high-speed camera was placed near the composite to gather light data. Due to the projectile moving at high speeds and the safety issues related to this, the high-speed camera was moved out of the projectile's motion path. A small mirror was instead placed in the path of the projectile, behind the stand, to eliminate instances where damage may be done to the camera or mirror. The camera and mirror were then positioned with respect to the composite in order to gather maximum light emission data. Another high-speed camera was placed orthogonal to the projectile motion path and in-plane with the impact surface of the test composite. This camera was used to gather the composite's mechanical deformation data. The camera was placed about 1.2192 m from the Kolsky bar for reducing any instances of damage done to the camera. This setup is illustrated in FIG. 13.

Two photogates were used on the last foot of the Kolsky bar track for gathering ambient light data inside the track. As the projectile passed by each photogate on the Kolsky bar track, changes in ambient light in the track occur. The photogates were connected to a data acquisition system to enable the team to monitor these changes during a test. The data gathered was used to determine the velocity of the projectile at the specified launch pressure by looking at each of the photogate's data over the time a test was conducted. The photogates also served as a trigger to initiate recording of the high-speed cameras. With a known mass and velocity, the impact momentum of the projectile onto the composite can be calculated.

Figure 14:
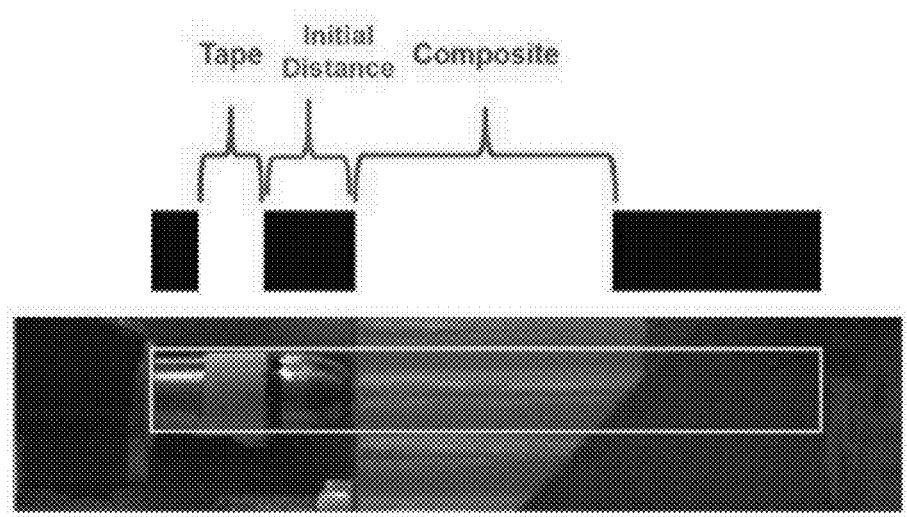
FIG. 14 is a photograph showing a white tape attached to the side wall of the striker as a reference to measure how much the striker dented the 3D-ISSC in the direction of through-the-thickness in Example 3.

The image processing aspect of this example measured striker deformation and light intensity. The deformation image processing aspect determined the displacement of the striker rod into the composite. By having an easily identifiable marker on both the striker and the composite, the image intensity can be increased to the point that only the tape and the composite have columns of pixels that average to be 99% of the highest possible 12-bit grayscale value, as shown in FIG. 14. A cropped section of the first white strip on the left has a single row vector taken. The number of white pixels gives the tape length in terms of pixels. By knowing the thickness of the tape, a ratio can be created between pixels and millimeters. The space between the two white stripes is the initial distance between the tape and composite. The distance is found the same way as for the length of the tape, but black pixels are counted rather than white. The code proceeds to run through the frames finding the velocity before impact of the striker or the deformation of the striker into the composite after impact Velocity and deformation are determined by comparing the distance between the two white stripes providing either a larger number than the initial distance (location for velocity) or a smaller number (depth of deformation). The second aspect of image processing involves breaking down the camera footage that receives light emission into a 12-bit grayscale to represent the light intensity. A threshold is established that is determined to be ambient light, then all cells that are below the threshold are turned off to produce the light intensity curve. From each frame there is an average of the 12-bit grayscale values of only illuminated pixels providing one grayscale value per frame.

Figure 15:
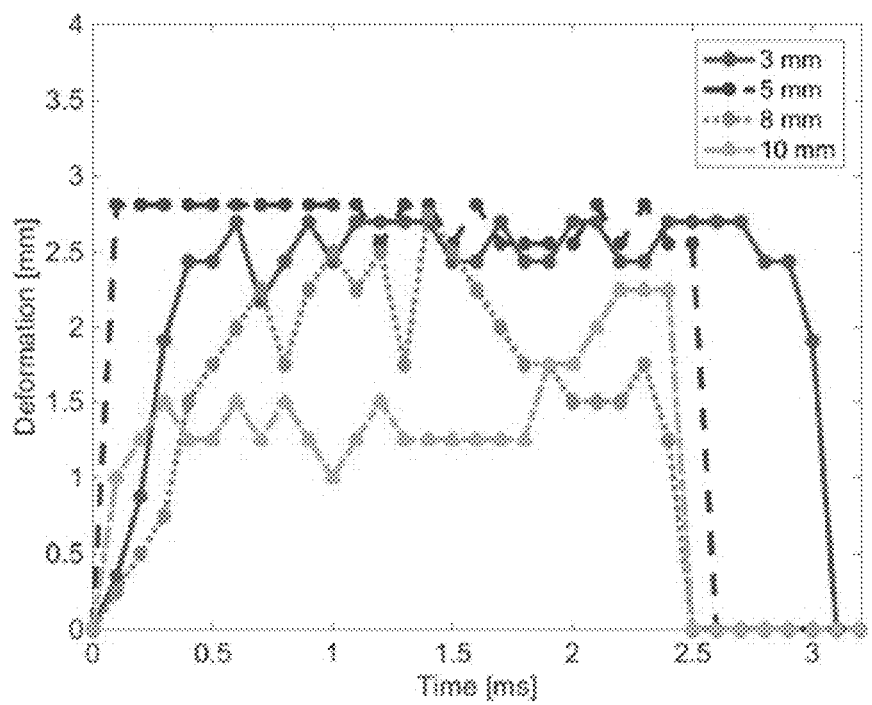
FIG. 15 shows the through-the-thickness deformation of the 3D-ISSC of Example 3 based on the striker's penetration displacement after image processing of the high-speed video.
Figure 16:
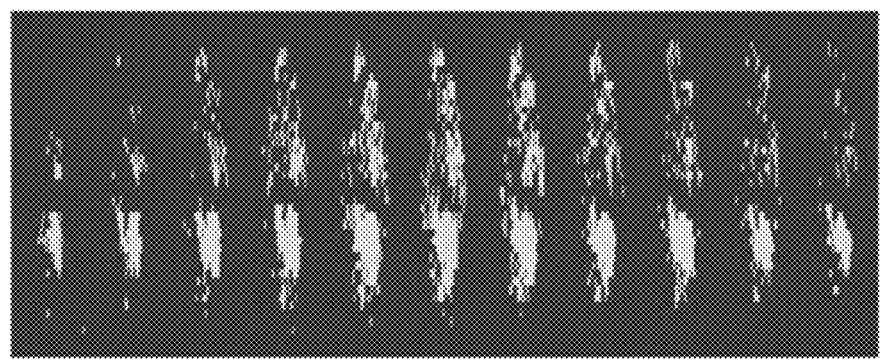
FIG. 16 shows 11 high-speed images of the data of Example 3 displayed in time sequence. The images are enhanced with a 2.5% threshold value to represent bright pixels with yellow dots.
Figure 17:
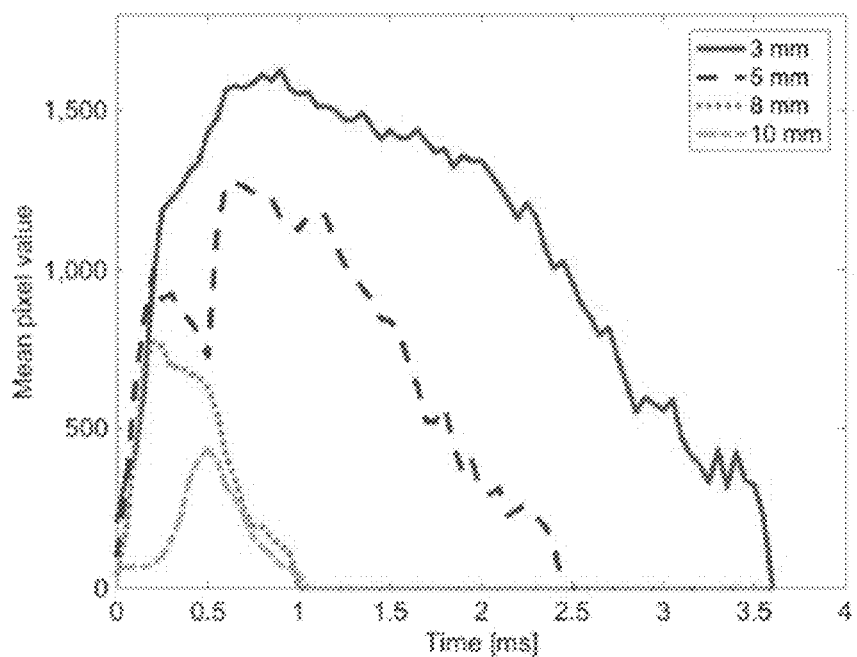
FIG. 17 plots FML light emission from EuD4TEA-embedded in a 3D-ISSC of Example 3 at various depths, showing various maximum intensities as well as the time duration of light emission.
Figure 18:
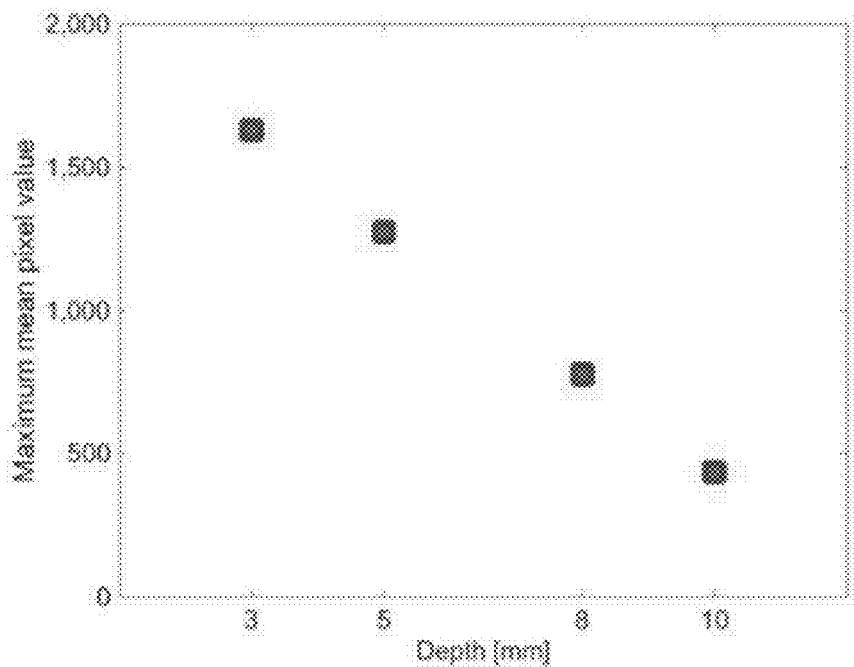
FIG. 18 shows that the maximum intensity of FML light emission in Example 3 decreases linearly as the depth of the EuD4TEA increases from the top of the 3D-ISSC.

FIG. 15 shows the striker's penetration depth vs. time from the tested four samples with various depths of $EuD_4TEA$-embedded in the four different 3D-ISSCs. Because shot pressures used for all four tests were kept constant at 124.1 kPa, the striker was assumed to carry the same amount of impact energy to be transferred onto the 3D-ISSC. Although overall deformation shapes in time for the four tests were different, one can observe that 2.8 mm maximum deformation was achieved, except in the 10 mm test case, which had a maximum deformation about 2.3 mm. This deviation is likely due to slight differences in impact location which result in different stiffness against impact occurrences due to the honeycomb core wall. The light intensity data of the 12-bit grayscale high-speed images from all the tests were smoothed with a 2.5% threshold as shown in FIG. 16. There is a clear distinction that can be made between depth and light intensity as well as duration of the light emission. These two metrics seemed to have the highest consistency, calling for more analysis to observe the correlation between the two metrics and depth of the FML $EuD_4TEA$ crystal. Averages were pixel values of the distinguished bright pixels, which have pixel values above the 2.5% threshold value or as shown in yellow pixels in FIG. 16 in each high-speed image. The mean pixel value was regarded as an intensity of FML light emitted from the $EuD_4TEA$-embedded in 3D-ISSC. From all four tests with various depths, the mean pixel value is shown vs. time in FIG. 17. The overall intensity of the FML light decreases as $EuD_4TEA$ was embedded in 3D-ISSC deeper from the top surface on which impact occurred. Also, time duration of FML light emission decreased as depth increases but did not decrease beyond the 8 mm test case. This strong relationship between characteristics of FML light emission and depth of $EuD_4TEA$ shows that an elastic wave propagates in the direction of through-the-thickness with attenuation. In FIG. 18, four different maximum mean pixel values from the four tests are shown as a function of depth of $EuD_4TEA$. There is a linear relationship between the maximum intensity of FML light emission and the depth of $EuD_4TEA$. After overlaying a best square linear fit to these data, the following regression model was found:

$$I=-170.26x+2134.4$$

where, I is maximum mean pixel value and x is the depth of the FML material.

Figure 19:
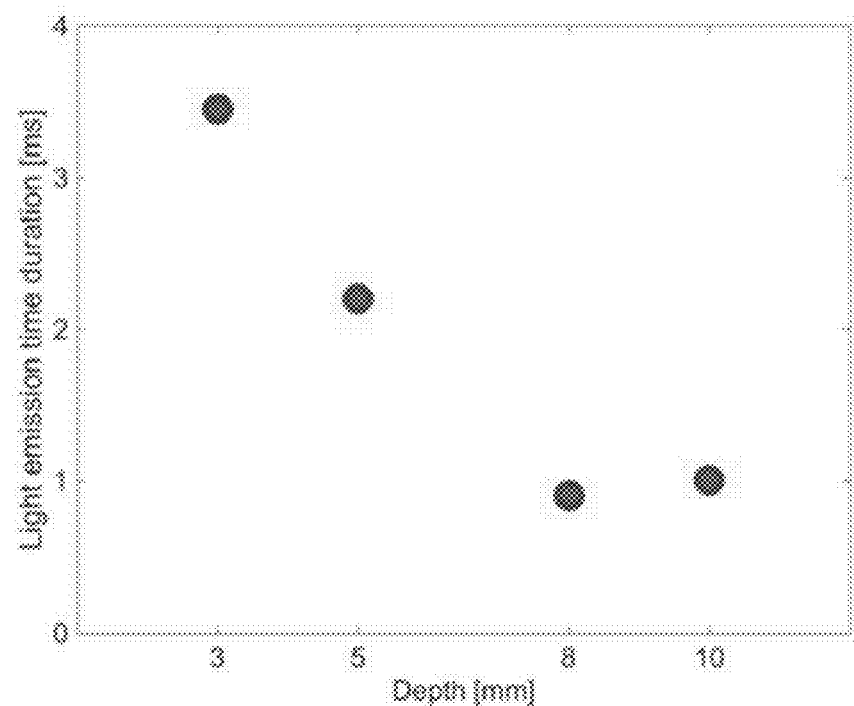
FIG. 19 shows that the time duration of FML light emission in Example 3 decreases as the depth of the EuD4TEA increases and plateaus from 8 mm depth.

Light emission duration was explored in a similar manner. The time interval for FML light emission was found using a 15% threshold of the intensity curves. That is, the start time for the incident is set when the curve first passes 15% of the peak value of a given test, and the finish time is when the curve passes 15% again. The time duration is shown as a function of depth of $EuD_4TEA$ in FIG. 19. It shows a linear relationship between the time duration of FML light emission and depth up to 8 mm. Beyond an 8 mm depth of $EuD_4TEA$, the time duration does not decrease further, and plateaus. It seems that $EuD_4TEA$ emits light in response to an applied impact and elastic wave for at least 1 ms. In summary, measured characteristics (i.e., intensity and time duration) of FML light emission showed a strong relationship with the depth of $EuD_4TEA$ embedded in a 3D-ISSC.

Intensity (i.e., the maximum intensity of FML light) of $EuD_4TEA$ decreased linearly as the depth of $EuD_4TEA$ increases. Similarly, the time duration of FML light emission decreased as the depth of $EuD_4TEA$ increased up to 8 mm. However, beyond 8 mm the time duration plateaued.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A system for detecting strain or strain rate in a composite, the system comprising:
   a honeycomb composite comprising a plurality of cells;
   a fracto-mechanoluminescent (FML) material encased in an optically transparent material disposed in a subset of said cells;
   one or more photodiodes;
   one or more optical conductors, each configured to transmit light emitted by the FML material disposed in each cell of said subset to one of said photodiodes; and
   a reflective material disposed between said optically transparent material and one or more interior surfaces of each cell of sail subset.

2. The system of claim 1 wherein said FML material comprises one or more $EuD_4TEA$ crystals.

3. The system of claim 1 wherein said optical transparent material comprises polydimethylsiloxane.

4. The system of claim 1 wherein each said optical conductor comprises an optical fiber.

5. The system of claim 1 wherein said reflective material comprises a biaxially-oriented polyethylene terephthalate film.

6. The system of claim 1 wherein said reflective material surrounds said optically transparent material.

7. The system of claim 1 wherein said reflective material lines the one or more interior surfaces of each cell of said subset.

8. The system of claim 1 wherein said honeycomb composite is selected from the group consisting of structural composite, fiber-reinforced polymer composite, and fiber-reinforced plastic composite.

9. The system of claim 1 wherein an Intensity of light emitted by said FML material is related to a magnitude of strain or strain rate experienced by said honeycomb composite at a location of the FML material emitting said light.

10. The system of claim 1 wherein an intensity of light emitted by said FML material is related to the distance of said FML material from a surface of said honeycomb composite that receives an impact.

11. The system of claim 10 wherein light emitted from a plurality of FML materials disposed at different distances from a surface of said honeycomb composite provides a three-dimensional map of damage experienced by said composite.

12. The system of claim 1 further comprising a high speed video camera or high frame rate camera to capture light emitted by the FML material.

13. The system of claim 1 wherein said optical conductors do not contact said FML material, said optically transparent material, or said honeycomb composite.

* * * * *

UNITED STATES PATENT AND TRADEMARK OFFICE
CERTIFICATE OF CORRECTION

PATENT NO. : 10,718,674 B1
APPLICATION NO. : 16/222810
DATED : July 21, 2020
INVENTOR(S) : Donghyeon Ryu and Quinlan James Towler Page 1 of 1

It is certified that error appears in the above-identified patent and that said Letters Patent is hereby corrected as shown below:

In the Claims

Column 14, Line 39, Claim 1, "sail" should be --said--

Column 14, Line 42, Claim 3, "optical" should be --optically--

Column 14, Line 58, Claim 9, "Intensity" should be --intensity--

Signed and Sealed this
Fifteenth Day of September, 2020

Andrei Iancu
*Director of the United States Patent and Trademark Office*